US012536624B1

(12) United States Patent
Khachatryan et al.

(10) Patent No.: US 12,536,624 B1
(45) Date of Patent: Jan. 27, 2026

(54) AUTO-REGRESSIVE VIDEO GENERATION WITH LONG-TERM FRAME MEMORY

(71) Applicant: PICSART, INC., Hallandale Beach, FL (US)

(72) Inventors: Levon Khachatryan, Yerevan (AM); Daniil Hayrapetyan, Yerevan (AM); Hayk Poghosyan, Yerevan (AM); Vahram Tadevosyan, Yerevan (AM); Zhangyang Wang, New York, NY (US); Shant Navasardyan, Yerevan (AM); Roberto Henschel, Berlin (DE); Humphrey Shi, Atlanta, GA (US)

(73) Assignee: PICSART, INC., Hallandale Beach, FL (US)

( * ) Notice: Subject to any disclaimer, the term of this patent is extended or adjusted under 35 U.S.C. 154(b) by 0 days.

(21) Appl. No.: 19/082,320

(22) Filed: Mar. 18, 2025

(51) Int. Cl.
   *G06T 5/70* (2024.01)
   *G06T 9/00* (2006.01)
   *G06V 10/74* (2022.01)
   *G06V 10/80* (2022.01)

(52) U.S. Cl.
   CPC ............ *G06T 5/70* (2024.01); *G06T 9/00* (2013.01); *G06V 10/761* (2022.01); *G06V 10/806* (2022.01); *G06T 2207/20081* (2013.01); *G06T 2207/20182* (2013.01)

(58) Field of Classification Search
   CPC ... G06T 5/70; G06T 9/00; G06T 2207/20081; G06T 2207/20182; G06V 10/761; G06V 10/806
   See application file for complete search history.

(56) References Cited

U.S. PATENT DOCUMENTS

| | | | |
|---|---|---|---|
| 2020/0036995 A1 | 1/2020 | Rippel | |
| 2020/0089965 A1 | 3/2020 | Hollander | |
| 2022/0138247 A1 | 5/2022 | Kotov | |
| 2023/0126806 A1 | 4/2023 | Kim | |
| 2024/0037835 A1 | 2/2024 | Croxford | |
| 2024/0135630 A1 | 4/2024 | Nagano | |

(Continued)

OTHER PUBLICATIONS

U.S. Appl. No. 19/082,303, filed Mar. 18, 2025, Non-Final Office Action mailed May 1, 2025.

(Continued)

*Primary Examiner* — Michael E Teitelbaum
(74) *Attorney, Agent, or Firm* — Arluys IP, P.C

(57) ABSTRACT

Techniques are described for an autoregressive user input-to-video (e.g., text-to-video or image-to-video) generation. Using these approaches, a video of unlimited length and without temporal inconsistencies is generated based on the user input. In an implementation, the system receives user input, having particular content, to generate a sequence of video frames, having the same content. The system generates an output sequence of video frames, having the same particular content, by iteratively denoising the frames and conditioning the generation based on the user input. The system may additionally integrate initial anchor frame features with the user input when conditioning the generation of the output sequence of frames. The system may additionally condition each denoising iteration of the output sequence of video frames based on the features of the previous sequence of output video frames.

18 Claims, 12 Drawing Sheets

(56) References Cited

U.S. PATENT DOCUMENTS

| | | | |
|---|---|---|---|
| 2024/0169604 A1 | 5/2024 | Gandelsman | |
| 2024/0320965 A1* | 9/2024 | Ho | G06N 3/045 |
| 2024/0340329 A1 | 10/2024 | Jiang | |
| 2024/0428956 A1 | 12/2024 | Stoyanov | |
| 2025/0047806 A1 | 2/2025 | Menini | |

OTHER PUBLICATIONS

Lvmin Zhang et al., "Adding Conditional Control to Text-to-Image Diffusion Models", In Proceedings of the IEEE/CVF International Conference on Computer Vision, pp. 3836-3847, 2023.

Xinyuan Chen et al., "Seine: Short-to-Long Video Diffusion Model for Generative Transition and Prediction." In the Twelfth International Conference on Learning Representations, Nov. 6, 2023, 15 pages.

Yuwei Guo et al., "AnimateDiff: Animate Your Personalized Text-to-Image Diffusion Models Without Specific Tuning.", In the Twelfth International Conference on Learning Representations, Feb. 8, 2024, 13 pages.

Zuozhuo Dai et al., "AnimateAnything: Fine-Grained Open Domain Image Animation with Motion Guidance.", arXiv:2311.12886v2, Dec. 4, 2023, 11 pages.

Wenming Weng et al., "ART•V: Auto-Regressive Text-to-Video Generation with Diffusion Models." arXiv preprint arXiv:2311.18834, Nov. 30, 2023, 24 pages.

Jinbo Xing et al., "DynamiCrafter: Animating Open-domain Images with Video Diffusion Priors.", arXiv preprint arXiv:2310.12190, Nov. 27, 2023, 20 pages.

Fu-Yun Wang et al., "Gen-L-Video: Multi-Text to Long Video Generation via Temporal Co-Denoising.", arXiv preprint arXiv:2305.18264, May 29, 2023, 22 pages.

Shiwei Zhang et al., "I2VGen-XL: High-Quality Image-to-Video Synthesis via Cascaded Diffusion Models.", arXiv:2311.04145v1, Nov. 7, 2023, 11 pages.

Jiuniu Wang et al., "Modelscope Text-To-Video Technical Report.", arXiv preprint arXiv:2308.06571, Aug. 12, 2023, 14 pages.

Chenlin Meng et al., "SDEdit: Guided Image Synthesis and Editing with Stochastic Differential Equations.", In International Conference on Learning Representations, Jan. 5, 2022, 33 pages.

Yuwei Guo et al., "SparseCtrl: Adding Sparse Controls to Text-to-Video Diffusion Models.", arXiv preprint arXiv:2311.16933, Nov. 28, 2023, 11 pages.

Andreas Blattmann et al., "Stable video diffusion: Scaling latent video diffusion models to large datasets.", arXiv preprint arXiv:2311.15127, Nov. 25, 2023, 30 pages.

Haonan Qiu et al., "FreeNoise: Tuning-Free Longer Video Diffusion via Noise Rescheduling.", In the Twelfth International Conference on Learning Representations, Jan. 30, 2024, 15 pages.

Gyeongrok Oh et al., "MEVG: Multi-event Video Generation with Text-to-Video Models.", arXiv preprint arXiv:2312.04086, Jul. 16, 2024, 35 pages.

U.S. Appl. No. 19/082,303, filed Mar. 18, 2025, Office Communication mailed Aug. 14, 2025.

* cited by examiner

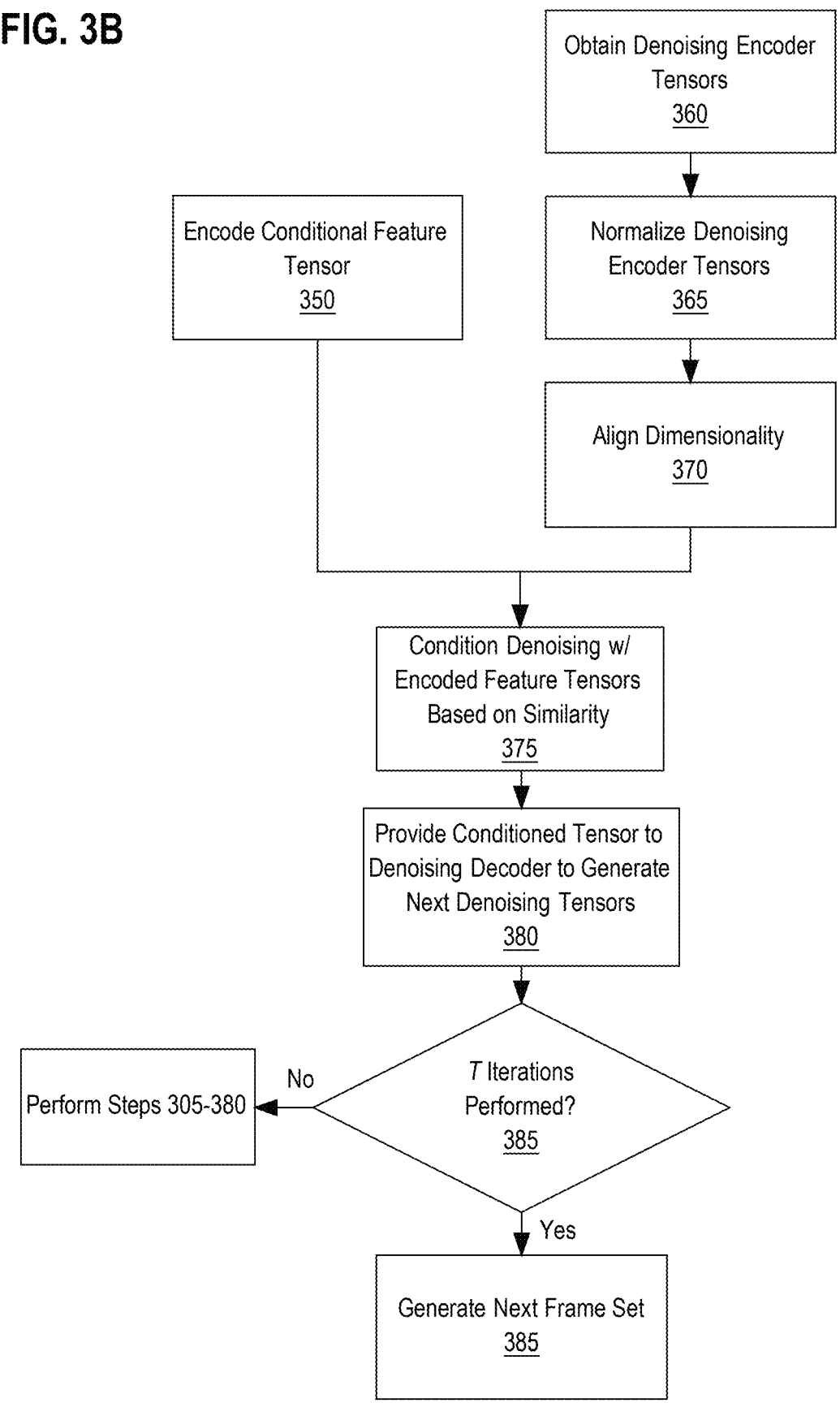

AUTO-REGRESSIVE VIDEO GENERATION WITH LONG-TERM FRAME MEMORY

RELATED APPLICATIONS

This application is related to the application Ser. No. 19/082,303, entitled "Auto-Regressive Video Generation With Past Frame Conditioning," filed concurrently herewith, the entire contents of which are hereby incorporated by reference.

FIELD OF THE TECHNOLOGY

The present invention relates to the field of image processing, in particular to auto-regressive video generation.

BACKGROUND

The approaches described in this section are approaches that could be pursued but not necessarily approaches that have been previously conceived or pursued. Therefore, unless otherwise indicated, it should not be assumed that any of the approaches described in this section qualify as prior art merely by virtue of their inclusion in this section.

Image generation machine learning (ML) models (denoising/diffusion models) have become prevalent. With the success of text-guided image synthesis and manipulation, the models were further extended to generate videos conditioned by textual prompts.

Despite the impressive generation quality and text alignment, the majority of existing approaches are mostly focused on generating short-frame sequences (typically of 16 or 24 frame-length). However, short videos are limited in real-world use cases such as ad-making, storytelling, etc.

The approach of simply training existing methods for long videos (e.g., ≥64 frames) is normally unfeasible. Even for generating short sequences, the computation training cost is very expensive (e.g., more than 260K steps and 4500 batch size are typically required). Without training on longer videos, video quality commonly degrades when short video generators are made to output long videos.

BRIEF DESCRIPTION OF THE DRAWINGS

In the drawings of certain implementations in which like reference numerals refer to corresponding parts throughout the figures:

FIGS. 3A and 3B are block diagrams that depict a process for regressively generating video frames based on user input, in one or more implementations.

DETAILED DESCRIPTION

In the following description, for the purposes of explanation, numerous specific details are set forth in order to provide a thorough understanding of the present invention. It will be apparent, however, that the present invention may be practiced without these specific details. In other instances, structures and devices are shown in block diagram form in order to avoid unnecessarily obscuring the present invention.

General Overview

The approaches herein describe an autoregressive user input-to-video (e.g., text-to-video or image-to-video) generation. Using these approaches, a video of unlimited length and without temporal inconsistencies is generated based on the input request. The content of the generated video is derived from the content of the user input request. The user input request may be textual data describing the content for generating the video, an image depicting the content for generating the video, or both.

Figure 1:
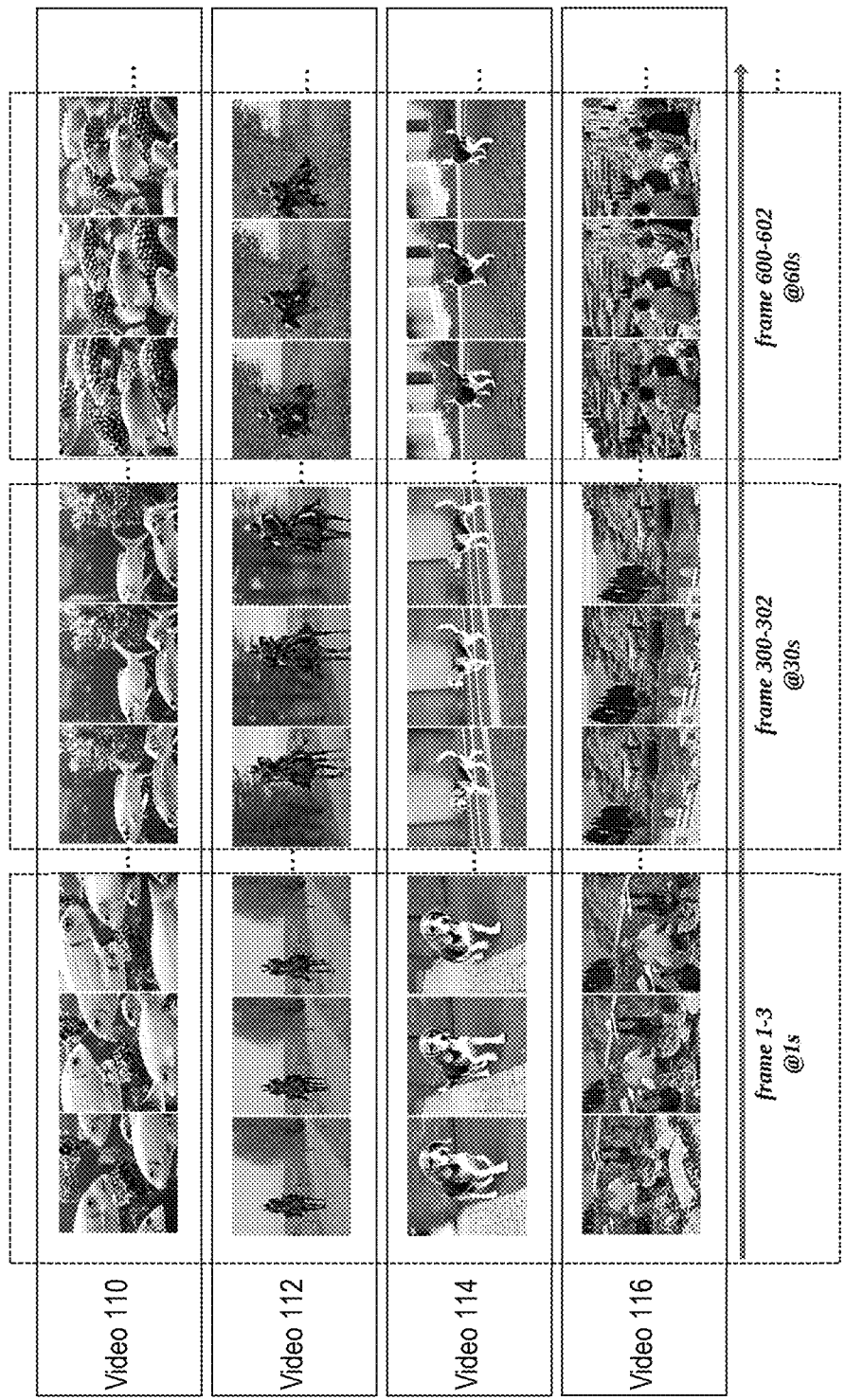
FIG. 1 is a diagram that depicts a set of videos generated in response to textual input, in an implementation.

FIG. 1 is a diagram that depicts a set of videos generated in response to a textual input request, in an implementation. Video 110's frames are generated for the textual input of "fishes swimming in ocean while the camera is moving"; Video 112's frames are generated for the textual input "a knight riding on a horse through the countryside"; Video 114's frames are generated using for the textual input of "a beagle walking down the street"; Video 116's frames are generated for the textual input of "beside the ancient amphitheater of Taormina, a group of friends enjoyed leisurely picnic." Each of Videos 110-116 may be generated for unlimited length with unlimited video content that is derived from the respective textual input. Frames 1-3 and Frames 300-302, although 300 frames apart, accurately depict "fishes swimming in an ocean while the camera is moving," at the same time preserving the consistent look and geometry of the depicted objects within the subsequent frames. Accordingly, FIG. 1 examples depict that the autoregressively generated frame sets of Videos 110-116 have consistent scene transitions within the frames.

To generate unlimited long content videos, one approach is to autoregressively generate video frames conditioned on the last frame(s). The term "conditioning" refers herein to the relationship of two sets of data values (referred to herein as "conditioning data" and "conditional data") affecting a set of data values (referred to as "conditioned data") according to the relationship criteria (e.g., similarity). The conditioning may generate a set of conditioning score(s) that describes the measure of the relationship. The generated conditioning scores may be used as weights that are applied to the conditioned data to perform the conditioning.

For example, when conditioning is based on similarity, the conditioning may generate a set of similarity scores that represent the similarity of the conditioning data with the conditional data. Then, the conditioned data may be manipulated to meet the similarity criteria based on the similarity scores. Conditional data, conditioning data and/or conditioned data may refer to the same data set on which the self-conditioning (also referred to as "self-attention") is performed.

One approach to performing the similarity-based conditioning of data is using attention techniques. With the attention techniques, the conditioning data, a query tensor (Q), is compared with the conditional data, key tensor (K), to generate weights with which to condition the value tensor (V). Additional weights may attenuate/negate active connections in conditioning. For example, if X is an input tensor that is used for self-attention, the weights may be represented as:

$$Q=XW_Q, K=XW_K, V=XW_V$$

where only active (non-zero) weights of $W_Q$ $W_K$ $W_V$ matrices contribute to Q, K, and V.

Therefore, the resultant conditioned tensor from the attention may have a reduced number of features and may be represented by the following equation:

$$\text{Attention} = \text{softmax}\left(\frac{QK^T}{\sqrt{d_k}}\right)V$$

As described in the above equation, each similarity score may be calculated by a dot product of Q and the transpose of K. Additionally, the similarity scores may be scaled and/or normalized (e.g., using the Softmax algorithm) before conditioning the V.

Thus, the value data of the conditioned data (e.g., V) is manipulated using the similarity scores to meet the conditioning criteria, thereby attenuating the less similar data while amplifying the more similar data.

In an implementation, when performing similarity-based conditioning of the new video frames by the conditioning data of the last frame of the previous set, the generated video may lead to inconsistent scene transitions. This is because, in such an implementation, the additional zero-filled frames are concatenated to the conditioning last frame before being plugged into the attention techniques. However, this inconsistency in the input leads to inconsistencies in the output. Additionally, the last frame conditioning approaches of image-to-video methods, when applied autoregressively by conditioning on the last frame of the previous set, eventually lead to video stagnation. In each cycle of conditioning, even a small inconsistency error gets accumulated and propagated to the next cycle, leading to a noticeable deterioration in video quality.

In addition to such temporal inconsistencies as video stagnation, the generated video may suffer from object appearance/characteristic changes and video quality degradation over time. Such degradations occur because of conditioning only with the last frame(s) of the previous set, which overlooks the long-term dependencies of the autoregressive process.

In another implementation, to resolve the inconsistency in content in frame-to-frame content (scene) transition, autoregressive user input-to-video techniques include long/short-term memory conditioning that generates long videos without temporal inconsistencies.

In an implementation, an auto-regressive user input-to-video system (AUI2VS) includes a Conditional Attention Module (CAM), which, due to its attentional nature, effectively borrows the content information from the previous frames to generate new ones while not restricting the motion by the previous structures/shapes in the sequential frames. In an implementation, while new frames are being generated, the previous frame features and new frame features are integrated together using techniques discussed herein. The new frames are then conditioned based on the similarity of new frame features with the integrated features.

To address quality degradation issues, the AUI2VS may include an Appearance Preservation Module (APM) that extracts object or global scene appearance information from an initially generated image (anchor frame) and conditions the video frame generation process of frame sets with that information. Thereby, the APM keeps object and scene features consistent across the autoregressive process.

Other techniques of the AUI2VS include the improvement of the quality and resolution of the long video generation. The AUI2VS uses a high-resolution text-to-video or image-to-video model and enhances consecutive frame sets, which may include frames that overlap within the frame sets. The AUI2VS performs a randomized blending approach for seamless blending of overlapping the enhanced frame sets.

Auto-Regressive User Input-to-Video System (AUI2VS) Overview

Figure 2:
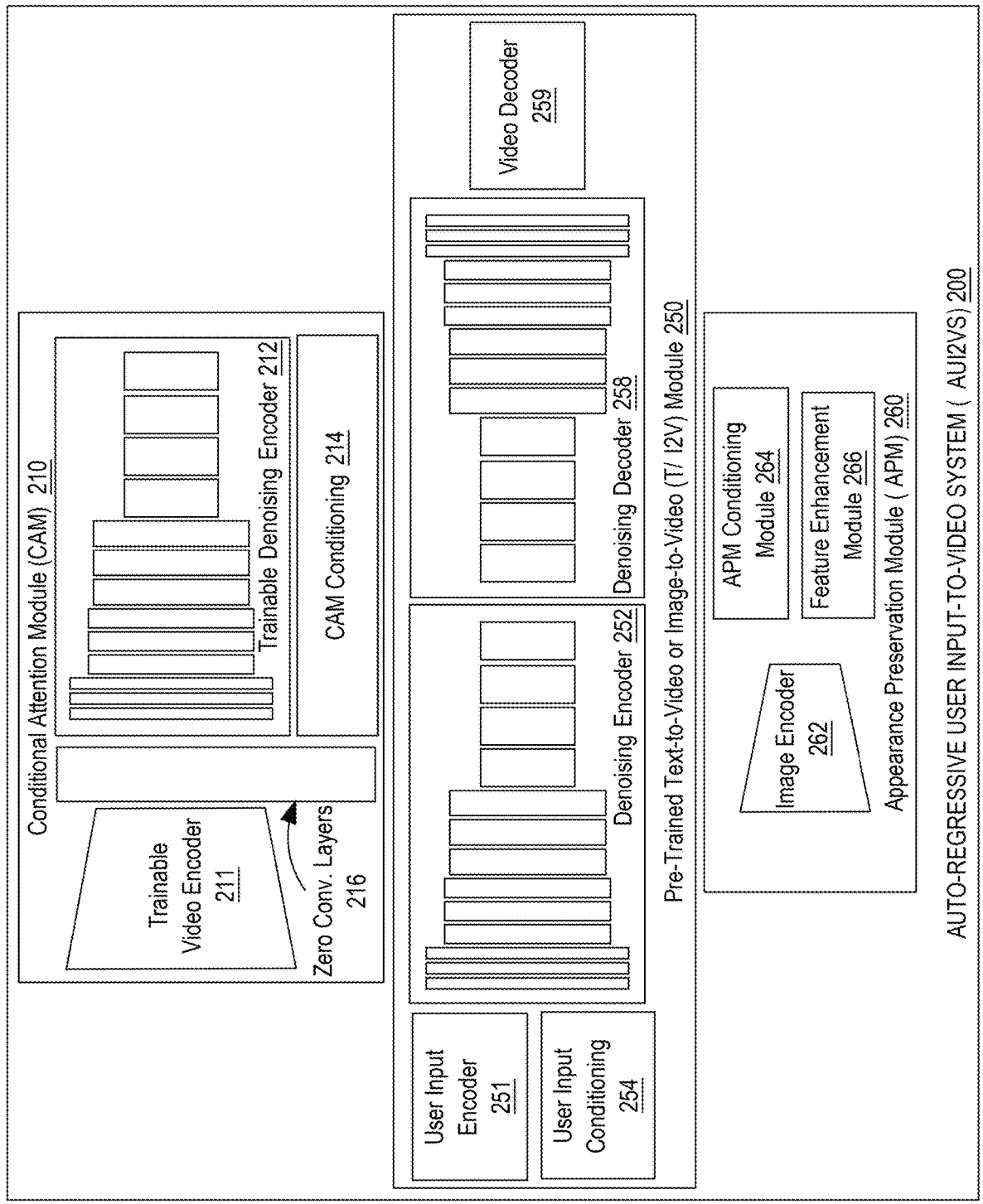
FIG. 2 is a block diagram that depicts an Auto-Regressive User Input-To-Video System (AUI2VS), in one or more implementations.

FIG. 2 is a block diagram that depicts an Auto-regressive User Input-To-Video System (AUI2VS) 200, in one or more implementations. AUI2VS 200 includes Pre-Trained Text-To-Video Module or Image-To-Video Module (T/I2V) 250. The term "pre-trained" refers herein to such model(s) that have been obtained by training algorithm(s) separately and independently of trainable models of AUI2VS 200 described herein. Such pre-trained models were separately obtained prior to the generation of the trainable models of AUI2VS 200 described herein and have immutable/fixed parameter values during the training of the trainable models of AUI2VS 200.

Pre-trained T/I2V Module 250 includes generative machine learning model(s) that generate short video clips from textual descriptions. T/I2V Module 250 uses natural language processing (NLP) and computer vision techniques and includes multiple trained models. T/I2V Module 250 takes as an input a textual input, such as "a panda playing in the Times Square," and generates a short sequence of video frames that aligns with the content of the textual input request. To do so, T/I2V Module 250 employs a denoising-based (diffusion) algorithm, similar to models like Stable Diffusion® for images, however, adapted for video generation.

In an implementation, T/I2V Module 250's diffusion model is generated by learning (during the ML training phase) to reverse a noise process (de-noising) to generate coherent outputs extended across time for video frames. To align the videos with the content of the requested text input, T/I2V Module 250 includes User Input Encoder 251, which converts the textual input to textual embeddings/features or the image input to image features, in an implementation. User Input Conditioning 254 provides the textual or image embeddings to Denoising Encoder 252 and Denoising Decoder 258 to condition the generation of the video frames from random noise by T/I2V Module 250 according to the textual input. Video Decoder 259 takes as input the frame embeddings generated by Denoising Decoder 258 and converts them into reproducible video frames.

The training of the ML algorithm for T/I2V Module 250 is performed on a large-scale multimodal dataset containing millions of video-text pairs. The training may be performed on each model of T/I2V Module 250 separately, together, or in one or more groups. The result of the training is the generation of the models for User Input Encoder 251, User Input Conditioning 254, Denoising Encoder 252, Denoising Decoder 258 and Video Decoder 259. The techniques discussed herein use pre-trained models for T/I2V Module 250.

Additionally, AUI2VS 200 includes Conditional Attention Module (CAM) 210 and/or Appearance Preservation Module (APM) 260, in one or more implementations.

CAM 210 performs the conditioning of the frame generation by T/I2V Module 250 at each denoising step with past frame features, in an implementation. CAM 210 may include a trainable pixel-space video encoder, Trainable Video Encoder 211, and a trainable denoising encoder, Trainable Denoising Encoder 212. Both Video Encoder 211 and Denoising Encoder 212 are trained to provide conditional data input to T/I2V Module 250. Video Encoder 211 encodes past frame(s) into pixel-based features. Trainable Denoising Encoder 212 generates conditional data for T/I2V Module 250 according to the past frame(s) features via CAM Conditioning 214. Zero Convolution Layer(s) 216 smoothes the previous frame(s) spatial feature transition to the latent domain of denoising for performing conditioning of the T/I2V Module 250 output without introducing distortions.

APM 260 performs conditioning of the frame generation by T/I2V Module 250 at each denoising step with anchor frame features, in an implementation. APM 260 may combine together the feature information of the textual prompt with that of the anchor frame from the initially generated set of frames and may generate conditional data for T/I2V Module 250. APM 260 may include Image Encoder 262, Feature Enhancement Module 266, and APM Conditioning Module 264.

Image Encoder 262 extracts image features from the anchor frame, while User Input Encoder 251 similarly generates text features/embeddings from the user's textual input or user's image input. Feature Enhancement Module 266 enhances the integrated textual and image features. APM Conditioning Module 264 generates the conditional data and provides the conditional data to T/I2V Module 250 to condition the denoising. Thereby, T/I2V Module 250 generates text input and anchor frame-conditioned output sequence of frames.

Each of the elements of FIG. 2 (and its modules/components) may be implemented in various implementations, using one or more computer programs, other software elements, and digital logic such as ASICs or FPGAs, each of which is configured using instructions, gates or logic to perform the functions described herein during use or execution, in either a general-purpose or a special-purpose computer system.

Generation of Initial Frame Set

Figure 3A:
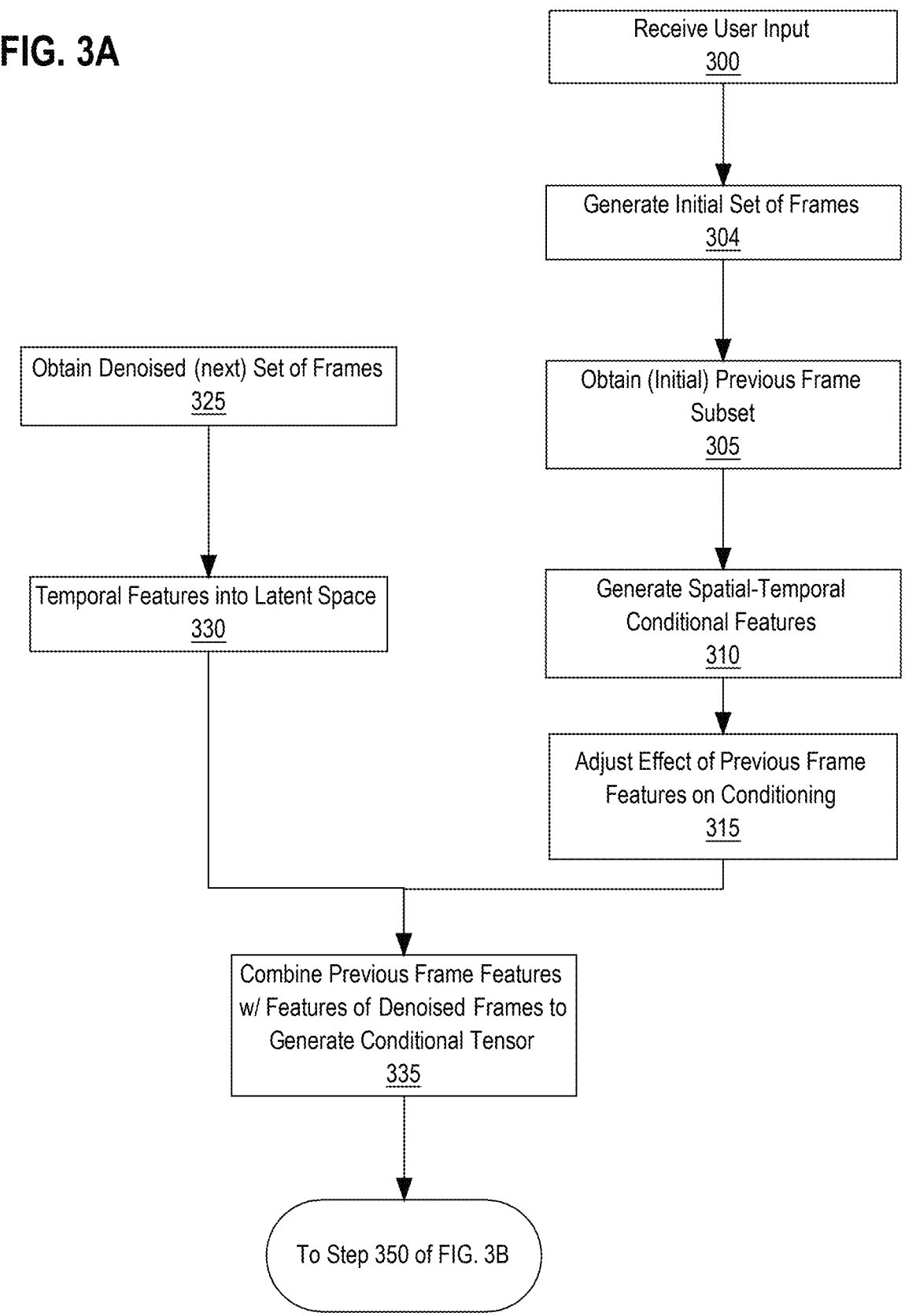

FIGS. 3A and 3B are block diagrams that depict a process for regressively generating video frames based on user input, in one or more implementations. At step 300 of FIG. 3A, AUI2VS 200 receives an input to generate video frames describing the content of the input. The input may be a textual input and/or an image input. Although the textual input is referenced hereafter, a multimedia input may be similarly used. Any informational user input features may be extracted through one or more machine learning models (e.g., image, text encoders) and used as user feature data for the techniques discussed herein.

At step 304, AUI2VS 200 provides the received input to pre-trained T/I2V Module 250 to generate an initial set of frames, in an implementation. For example, AUI2VS 200 may receive textual input "a panda playing guitar on Times Square" to regressively generate a video. T/I2V Module 250 generates 16 video frames depicting a panda playing a guitar in Times Square. The initial set of frames covers a relatively short period of time, e.g., less than 10 seconds. Because pre-trained T/I2V Module 250 initially generates a short period video, the video should not contain any structural flaws as opposed to if pre-trained T/I2V Module 250 were to generate a longer video.

AUI2VS 200 may use the previously generated video frame set or a subset thereof as conditional data for generating an autoregressive video frame set of arbitrary length, which has dynamic content that continues to match the input. The previous set of frames used for such conditional data is referred to herein as the "previous frame subset." In an implementation, the subset obtained is a number of sequential frames in the previously generated video frame set that are temporally last.

At step 305, AUI2VS 200 obtains the previous frame subset. In an implementation, at the first iteration, since there have not yet been any new frames generated by AUI2VS 200, the process obtains the initially generated video frame sequence (or a subset thereof), which was generated without any conditioning by CAM 210 and APM 260.

Figure 4:
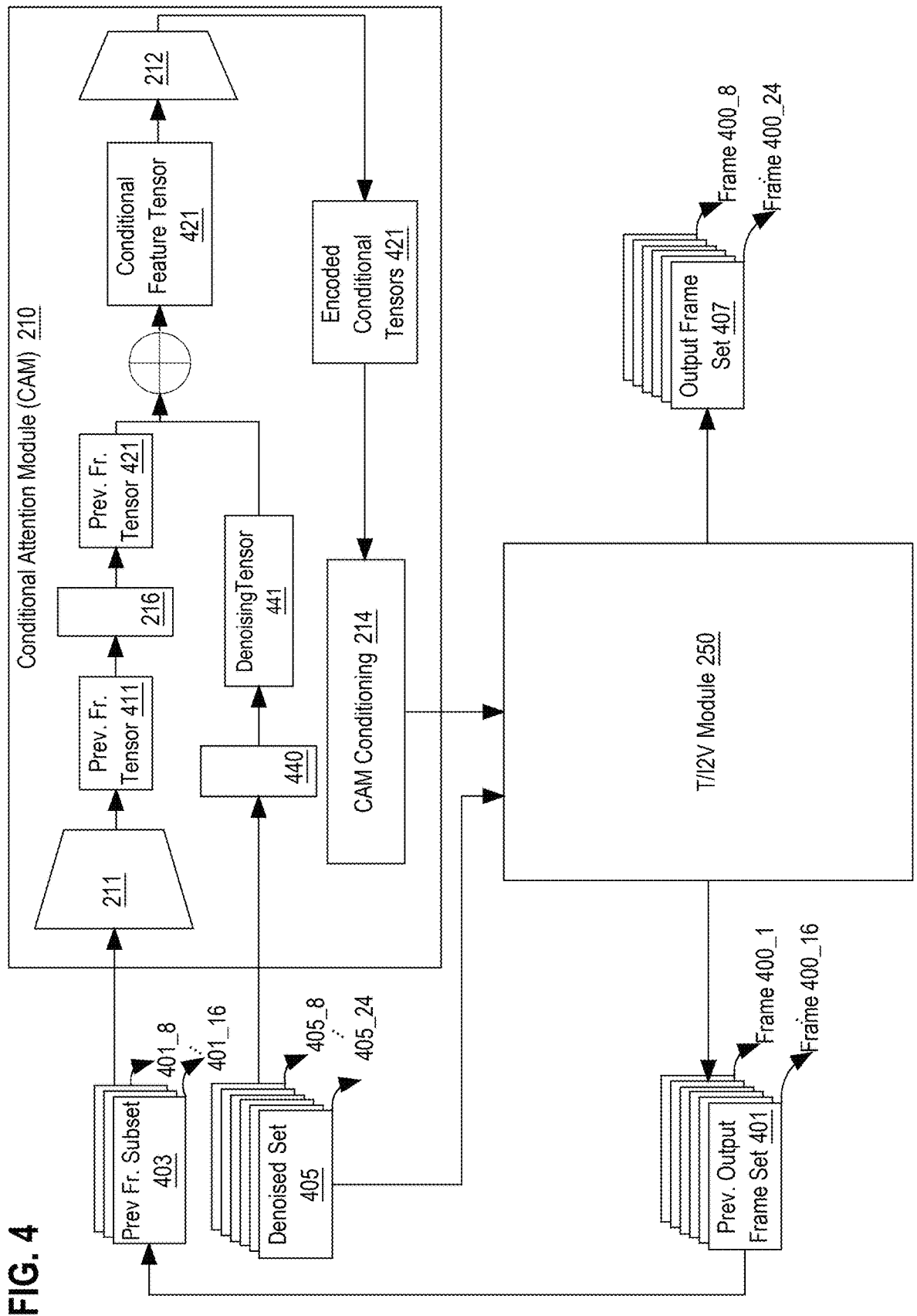
FIG. 4 is a block diagram depicting the data flow of a Conditional Attention Module (CAM), in an implementation.

FIG. 4 is a block diagram depicting the data flow of Conditional Attention Module (CAM) 210, in an implementation. For example, T/I2V Module 250 has previously generated Previous Output Frame Set 401 having a frame sequence of Frames 400_1 through 400_16. This may be the initial sequence that was generated solely using the user input and without any conditioning by CAM 210 or APM 260.

A subset of these frames, Previous Frame Subset 401_8-401_16 is provided to CAM 210 for generating the conditional data for the next output sequence of frames, Output Frame Set 407. The next output sequence of frames may be generated in overlapping sets. For example, the to-be-generated frames, Frame 400_8-400_24 of next Output Frame Set 407, are generated in overlapping sets; each subsequent output set has 8 frames that overlap with the previous set. In this example, frames 400_8 through 400_16 overlap in Previous Output Frame Set 401 and next Output Frame Set 407. However, in other examples, the output frames may not overlap.

Conditional Attention Module (CAM)—Trainable Encoder

CAM 210 transforms the previous frame subset into conditional data for conditioning the denoising by pre-trained T/I2V Module 250. At step 310, CAM 210 encodes the previous frame subset to generate a tensor of the spatial-temporal conditional features of the previous frame subset. Trainable Video Encoder 211 may use pixel-based spatial inter-dependency as well as pixel-based temporal inter-dependency to encode the previous frame subset into a tensor. The encoded tensor may match the dimensionality of the input tensor for denoising by pre-trained T/I2V Module 250.

Continuing with the example in FIG. 4, Previous Frame Subset 403, having frames 400_8 through 400_16 of Previous Output Set 401, is provided to CAM 210. Trainable Video Encoder 211 of CAM 210 encodes Previous Frame Subset 403 into Previous Frame Tensor 411 that contains extracted spatial and temporal features from Previous Frame Subset 403. Previous Frame Tensor 411 may capture meaningful visual patterns while reducing the original data size, making Previous Frame Tensor 411 suitable for downstream tasks.

CAM-Integration with Current Version of Denoising Input Tensor

The effect of the previous frame subset on the conditioning of the denoising frame output may be optimized (through training of weights) to yield a higher accuracy output frame sequence. Continuing with FIG. 3A, at step 315, the process adjusts the effect of the previous frame subset features on denoising by adjusting the weights on the values of the previous frame subset tensor. In an implementation, the measure of integration adjustment is determined during the training by the gradual integration of the previous frame subset tensor on the conditioning of the tensors being denoised in the latent domain.

In an implementation, Zero Convolution Layer(s) 216 are trained to adapt Encoder 211's spatial domain output of previous frame subset features to the domain of the noisy latents. The parameters (e.g., weights and bias) in Zero Convolution Layer(s) 216 are initialized to zero (no effect on conditioning by the previous frame subset) and then may change to non-zero values (or continue to be set to zero) during training to yield the loss function that meets the criteria for generating of output frames by T/I2V Module 250.

Zero Convolution Layer(s) 216 perform convolution by the kernel size 1×1, thereby operating independently on each spatial location of the previous frame subset tensor. Thereby, Zero Convolution Layer(s) 216 adjusts each value on the operated location of the previous frame subset features. The stride may also be set to 1, ensuring no downsampling of the spatial dimensions for the tensor.

Zero Convolution Layer(s) 216 may change the channel size to match the dimensions of the previous frame subset tensor to another tensor, if necessary, for future operations such as integration with such other tensor. Continuing with the example in FIG. 4, Zero Convolution Layer(s) 216 adjust the value(s) of Previous Frame Tensor 411 to yield Previous Frame Tensor 421.

In an implementation, the features of the input denoising tensor at each iteration of denoising performed by T/I2V Module 250 are, in part or in whole, integrated with the features of the previous frame subset to generate the conditional features for generating the next version of a denoising tensor by T/I2V Module 250. Accordingly, each new version of denoised frames generated by AUI2VS 200 is conditioned by a combination of the current version of denoising frame features and previous frame features, ensuring short-term memory and continuity in object progression through the frames.

To combine the features, at step 325, the process obtains the current version of the denoising input tensor. At each iteration of denoising by T/I2V Module 250, the current version of the denoising input tensor contains the denoised pixel features before the start of the iteration, initially containing only random noise, while at the last iteration containing close to the final features of the output sequence of frames.

At step 330, the pixel-based features of the current version of the input denoising tensor may be transformed into latent space. In an implementation, a trainable first transformer block flattens the spatial dimension (H×W) of the input tensor into spatial tokens per frame. The first transformer block captures temporal dependencies and attends to relationships between corresponding tokens across frames (e.g., motion or appearance consistency). The first transformer block also maintains coherence across frames such that objects and features appear and move consistently over time by learning temporal correlations.

The first transformer block uses attention mechanisms and, thereby, processes the entire sequence of frames simultaneously, capturing long-range dependencies across time. The first temporal transformer block may process the latent representation immediately after the spatial processing or spatial transformer blocks. Thereby, the temporal attention operates on spatially refined features. The block produces an updated latent representation of the input denoising tensor that may flatten the spatial dimensions (H and W). This updated representation reflects both spatial and temporal feature dependencies.

For example, continuing with FIG. 4, Denoising Set 405 of frames 405_8 through 405_24 is the input denoising tensor, which T/I2V Module 250 is to denoise to generate Output Frame Set 407 of frames 400_8 through 400_24. Thus, Denoising Set 405 is also provided to CAM 210 as input at each iteration of T/I2V Module 250 for combining with the features of the previous frame subset. First Transformer Block 440 performs attention techniques as described herein to yield Denoising Tensor 441 in the latent space.

At step 335, the transformed denoising tensor of features and the previous frame subset tensor are integrated to produce the conditional feature tensor that aggregates features of the current (and still noisy) output frames and the previous frames. At step 335, CAM 210 may perform the addition of values of the corresponding values of the transformed input denoising tensor of features with the values of the previous frame subset tensor to yield an aggregate feature tensor for conditional data.

Accordingly, continuing with the example of FIG. 4, Previous Frame Tensor 421, containing the features of the previous frame subset, is added to Denoising Tensor 441. To match the dimensions of the tensors for the addition, Denoising Tensor Set 405 may contain only a subset of the denoising set of frames used by T/I2V Module 250 to match the number of previous frames used. Alternatively, either First Transformation Block 440 may collapse the number of frames to match the dimensionality of Previous Frame Tensor 421, and/or Zero Convolution Layer(s) 216 may transform Previous Frame Tensor 411 to changed dimensions of Previous Frame Tensor 421 to match Denoising Tensor 441.

CAM-Encoding for Conditional Output

The process encodes conditional features to be aligned with those encoded features generated by Denoising Encoder 252 of T/I2V Module 250 at a given iteration. At step 350 of FIG. 3B, Trainable Encoder 212 performs the encoding of the conditional feature tensor that integrates the features of current frames being generated and the features of the previous frame subset. The output of each layer of Trainable Encoder 212 is an encoded conditional tensor of such features.

Layers of Trainable Denoising Encoder 212 mimic the layers of Denoising Encoder 252 of Pre-Trained T/I2V Module 250. Each layer of Trainable Denoising Encoder 212 has the same dimension as the corresponding layer of Denoising Encoder Layer 252 of T/I2V Module 250, and at the start of the training of Trainable Denoising Encoder 212 had the same parameter values.

Continuing with FIG. 4, trained Trainable Encoder 212 encodes the conditional feature tensor to generate Encoded Conditional Tensors 421. Each layer of trained Trainable Encoder 212 may generate a corresponding encoded conditional feature tensor. Such conditional feature tensors may be used for conditioning the denoising tensors generated by the corresponding layers of Denoising Encoder 252 of Pre-Trained T/I2V Module 250.

In an implementation, the denoising tensors may be transformed before conditioning. At step 360, the process obtains the output denoising encoder tensors as generated by the layers of Denoising Encoder 252.

At step 365, the denoising encoder tensors may be normalized. For example, Spatial-Temporal Group Normalization (STGN) techniques may be applied in spatial and/or temporal dimensions on a denoising encoder tensor. The feature maps of a denoising encoder tensor may be scaled and/or centered across spatial and/or temporal axes while preserving the feature information within the tensor.

Additionally or alternatively, a denoising tensor may be aligned in its dimensionality with the corresponding conditional feature tensor of the same layer, at step 370, to be conditioned by the same.

CAM-Conditioning Regressive Video Generation

Continuing with FIG. 3B, at step 375, CAM Conditioning 214 performs similarity-based conditioning on T/I2V Module 250's tensor(s). The process obtains an output tensor from a layer of Denoising Encoder 252 of T/I2V Module 250 as the conditioning data and the encoded conditional tensor generated by the corresponding layer of Trainable Denoising Encoder 212 of CAM 210 as the conditional data. The process may determine the similarity scores between the corresponding features of the conditional tensor and the conditioning tensor. The encoded conditional tensor may then be conditioned by the determined similarity scores to generate a conditioned feature tensor. The process may perform such conditioning for each layer of the denoising encoders using the layer's output tensors.

In an implementation, the conditioning at step 375 may be performed using a multi-head attention mechanism. In such an implementation, each head may represent a vector set of features, thereby generating a similarity score per feature type and conditioning the encoded conditional tensors of CAM 210 on a per-feature type basis. The per-feature type conditioning may yield a more accurate representation of encoded conditioned tensors, which, when transformed into an output frame set, may more accurately be based on the previous and current frame set features.

For example, CAM Conditioning 214 may perform per-pixel temporal attention to condition the output tensor. CAM Conditioning may select per-pixel feature values along the temporal axis of the tensors to generate similarity scores of the corresponding feature values. Accordingly, those pixels (and thus objects) in the current and previous frame sets that have the most temporal feature similarity will be amplified, while those with the least similarity are either attenuated or completely negated. Thereby, the denoising process of AUI2VS 200 generates, at each denoising iteration, frames that are temporally consistent with the previous frame set.

In an implementation, similarity-based conditioning may be performed by a sparse encoder. The weights of the sparse encoder may be trained together with the training of CAM 210 or separately. The trained weights more accurately condition the encoded conditioned tensor for the respective layer output of T/I2V Module 250. The generated encoded conditioned tensor(s) represent the combination of current and previous frame features, in which the feature values with higher similarity scores are amplified/attenuated/negated according to the weights.

Figure 5:
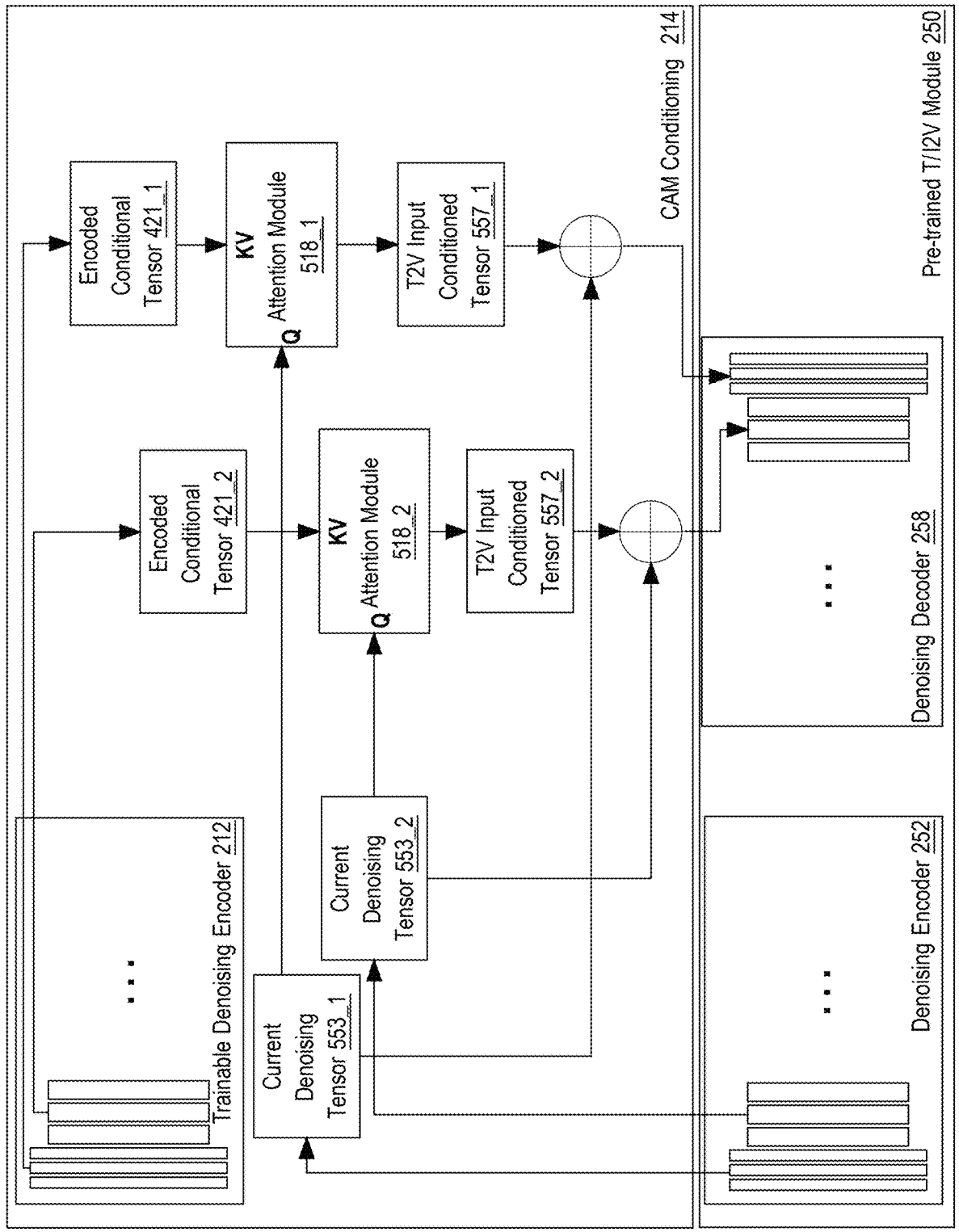
FIG. 5 is a block diagram depicting an example data flow of CAM conditioning, in one or more implementations.

FIG. 5 is a block diagram depicting an example data flow of CAM conditioning, in one or more implementations. Each layer of Trainable Denoising Encoder 212 generates a tensor such as Encoded Conditional Tensors 421_1 and 421_2. Since the Trainable Denoising Encoder 212 is a separately trained copy of Denoising Encoder 252 of T/I2V Module 250, Denoising Encoder 252 has the same number of layers, which generate the same dimension tensors such as Current Denoising 553_1 and Current Denoising Tensor 553_2. The generation of these tensors occurs at each iteration of denoising of AUI2VS 200.

Accordingly, at each iteration of denoising, Attention Module 518_1 and Attention Module 518_2 perform conditioning on the tensors of the respective layers. For example, Attentional Modules 518_1 performs the conditioning for the tensors of the first layer. Encoded Conditional Tensors 421_1 is the first layer output of Trainable Denoising Encoder 212 of CAM 210 and is provided as the KV input to Attentional Module 518_1. On the other hand, Current Denoising Tensors 553_1 is the first layer output of Denoising Encoder 252 of T/I2V Module 250 and is provided to Attentional Module 518_1 as the conditioning input Q. Similarly. Encoded Conditional Tensors 421_2 is the second layer output of Trainable Denoising Encoder 212 of CAM 210 and is provided as the KV input to Attentional Module 518_2. On the other hand, Current Denoising Tensors 553_2 is the second layer output of Denoising Encoder 252 of T/I2V Module 250 and is provided to Attentional Modules 518_2 as the conditioning input Q.

Each of Attentional Modules 518_1 and 518_2 may perform a respective per-pixel temporal multi-head attention of features to condition Encoded Conditional Tensors 421_1 and 421_2 based on similarity with the features of Current Denoising Tensors 553_1 and 553_2, respectively. The conditioning performed generates conditioned tensors for each layer, such as T2V Input Conditioned Tensors 557_1 and 557_2 for the first and second layers, respectively.

New Frame Generation Based on Previous Frame Subset Conditioned Input

The conditioned tensors that have been conditioned by the previous frame subset features (among others) are then decoded with or without encoded tensors from the current iteration of denoising. In an implementation, rather than each layer of Denoising Decoder 258 using a skip connection tensor input from the corresponding layer output of Denoising Encoder 252, each encoder layer's output tensor is added to the corresponding conditioned tensor to provide the skip connection input tensor for decoding by the corresponding layer of Denoising Decoder 258.

For example, continuing with FIG. 5, Current Denoising Tensors 553_1 encoded by Denoising Encoder 252 is added to T2V Conditioned Tensor 557_1 and provided as a skip-connection input tensor to the first layer of Denoising Decoder 258. Current Denoising Tensors 553_2 is added to T2V Conditioned Tensor 557_2 and provided as a skip-connection input tensor to the second layer of Denoising Decoder 258.

Accordingly, continuing with FIG. 3B, at step 380, at each iteration of denoising, previous frame conditioned tensors are provided to Denoising Decoder 258 as input to generate the next version of denoising tensors. The process performs steps 305-380, conditioning the conditioned tensor with previous frame subset features until the preconfigured number of denoising iterations expires. If, at step 385, the configured number of denoising iterations has been performed, the process transitions to step 385 to generate the next set of frames from the denoised tensor generated by Denoising Decoder 258. At step 385, based on the generated denoised tensor of the last iteration of denoising, the Video Decoder 259 generates a new output set of frames that are conditioned by the previous frame subset. The number of times the new set of frames may be generated by AUI2VS 200 may be pre-configured or received as part of the user input at step 300.

Training Conditional Attention Module

CAM 210's components, such as Video Encoder 211, Zero Convolution Layer 216, Denoising Encoder 212 and CAM Conditioning 214, may be trained separately or together. The training may be performed with Pre-Trained T/I2V Module 250, which has already been trained separately without CAM 210.

Figure 6:
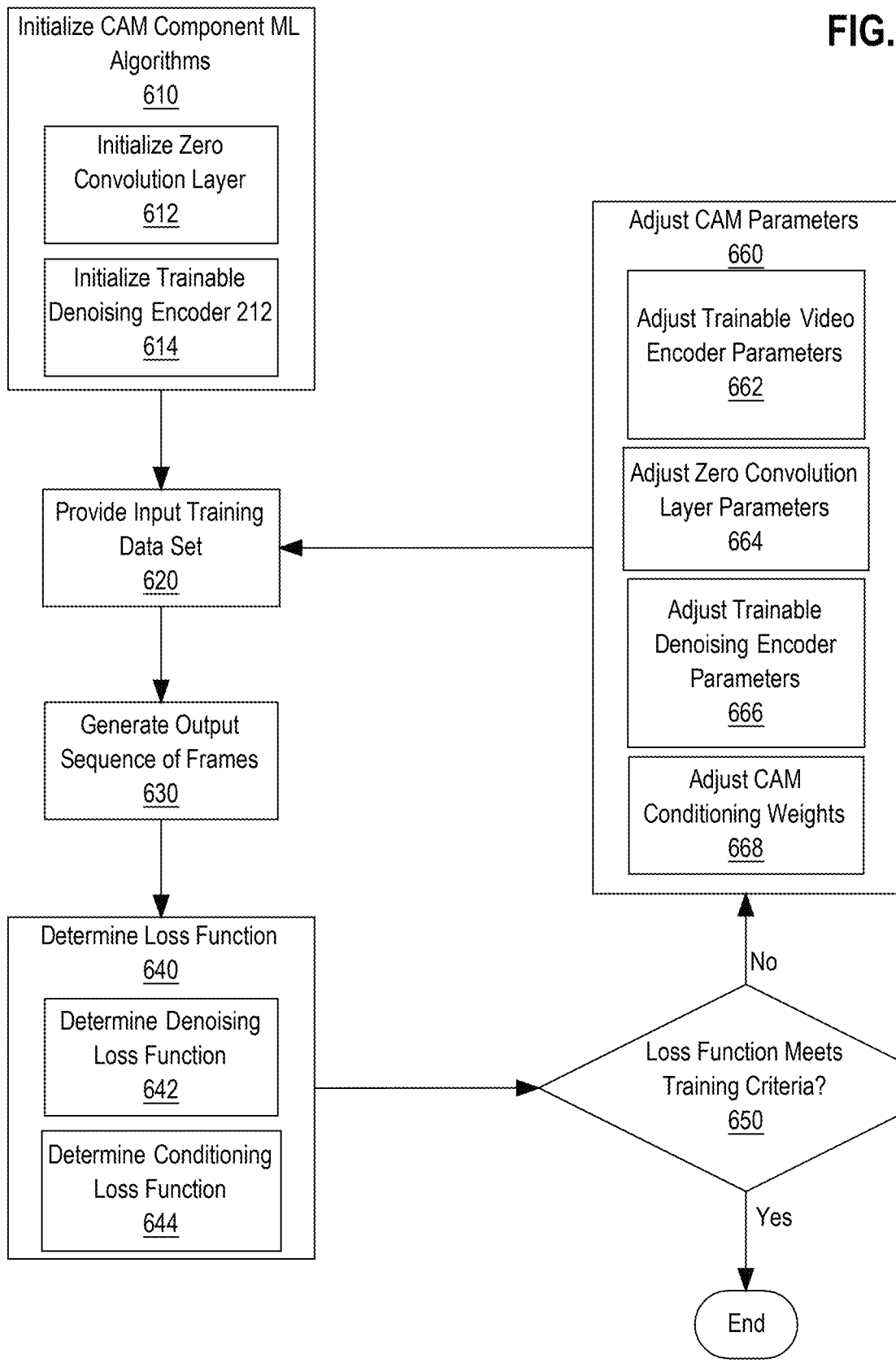
FIG. 6 is a block diagram depicting a process for training CAM, in one or more implementations.

FIG. 6 is a block diagram depicting a process for training CAM 210, in one or more implementations. At step 610, the parameters of one or more machine learning algorithms of CAM 210 are initialized. For example, Zero Convolution Layer 216 is initialized to have zero-valued weights at step 612. Thus, at the beginning of the training, the effect of the previous frame subset on the conditioning of the AUI2VS 200 output sequence of frames is negated, and only then, in the training, is it gradually increased to integrate the transition from temporal-spatial domain of the previous frame subset to the conditioning in the denoising domain.

Additionally, since Trainable Denoising Encoder 212 is an untrained copy of Denoising Encoder 252, at step 614, Trainable Denoising Encoder 212's parameter values may be initialized to the parameter values of the corresponding parameters of Denoising Encoder 252 of pre-trained T/I2V Module 250. During the training, as the effect of the previous frame features is gradually increased (e.g., using Zero Convolution Layer(s) 216), one or more parameters of Trainable Encoder 212 are changed to yield the minimal loss function for the generation of the output frame set.

At step 620, the process provides a training data set to AUI2VS 200 for performing training. The training data set may include the noisy video frames at each iteration, the actual noise added to the data during the noising of the frames (forward diffusion), and user (textual) input requests.

At step 630, AUI2VS 200 generates the output sequence of frames corresponding to input sequence of frames of the training data set. The output sequence of frames and other intermediate output data of various components of AUI2VS 200 are used to determine the loss function at step 640.

AUI2VS 200 determines the loss function using the training data set of the input sequence of frames and corresponding label data. In an implementation, the loss function may be a weighted average of multiple loss functions. One example of a loss function is the denoising loss function. At step 642, AUI2VS 200 may calculate the denoising loss function, which is based on the comparison of the noise level predicted by T/I2V Module 250 with the labeled noise level (the actual noise level) in the training data set of the input sequence of frames.

Another example of a loss function may be a conditioning loss. At step 644, the process may determine the conditioning loss function by comparing the features of the previous frame of the input sequence of frames with the features of the output sequence of frames.

At step 640, the training loss function may be determined by a weighted average of different loss functions, such as the denoising model loss function (calculated at step 642) and the conditioning loss function (calculated at step 644).

At step 650, the process determines whether the loss function meets the criteria for ending the training of the CAM 210. If, at step 650, the criteria for ending the training have not been met, then the process transitions to step 660.

At step 660, the process adjusts CAM 210 parameters. At step 662, the process may adjust the parameters of Trainable Video Encoder 211 to generate more accurate feature data of the previous frame subset. Additionally or alternatively, the process may adjust the parameters of Zero Convolution Layer 216 to increase the integration of the temporal-spatial previous frame subset features into the latent domain for the conditioning of the output frame sequence at step 664. For example, if a particular weight of Zero Convolution Layer 216 is eventually adjusted to 1, the corresponding feature (e.g., a value in Previous Frame Tensor 421) is fully passed to be integrated with the corresponding current feature to condition the output sequence of frames. Additionally or alternatively, at step 666, the process may adjust the parameters of Trainable Denoising Encoder 212 to generate a more accurate denoising (latent) representation of current and previous feature data. Additionally or alternatively, at step 668, the process may adjust the weights of CAM Conditioning 214 (attention algorithm). For example, the process may adjust the weights for Q, K, and V to appropriately condition the output frame sequence by the current and previous feature data.

After a number of iterations, when at step 650, the criteria for training have been met, the training of one or more machine learning algorithms of CAM 210 has successfully generated the machine learning models for Video Encoder 211, Denoising Encoder 212 and CAM Conditioning 214. CAM 210 may be used according to the techniques discussed herein for the generation of the output sequence of frames.

Appearance Preservation Module (APM)

For the new sequence of frames to have the same content as the user input, such as the user textual input request for video generation, the new sequence of frames is additionally or alternatively conditioned by the user input. For example, User Input Conditioning 254 may condition the new sequence of frames with the user input request (textual or image-based), causing the new sequence of frames to have the same content as described by the textual input request. To extract the features from the user request, the textual input request is encoded into a textual feature tensor (embeddings tensor) by User Input Encoder 251. The encoded textual features are used by User Input Conditioning 254 to generate conditional data for conditioning data of the denoising. Thereby, T/I2V Module 250 generates an output sequence of frames that have the same content as the input request.

However, regressively generating new output sequences of frames using the same user input may lead to stagnation, where the initially generated objects change appearance in the subsequent sequences of frames. For example, a person depicted in the initial sequence of frames with eyeglasses may not have the eyeglasses in the later frames, or a particular color becomes more dominant than in the previously generated frames.

In an implementation, particular anchor frame(s) are used in conditioning the output sequences of frames, in addition to conditioning the generation of the output sequence frames on the user data and/or CAM 210, to avoid stagnation in auto-regressive frame generation. The term "anchor frame(s)" refers to one or more images having the same content as the user input and are selected to be used in conditioning multiple subsequent output sequences of frames generated in response to the user input. Although the techniques described herein use a particular single anchor frame from an initial output sequence of frames, one or more frames from any one or more of the previously generated output sequences of frames may be used.

Figure 7:
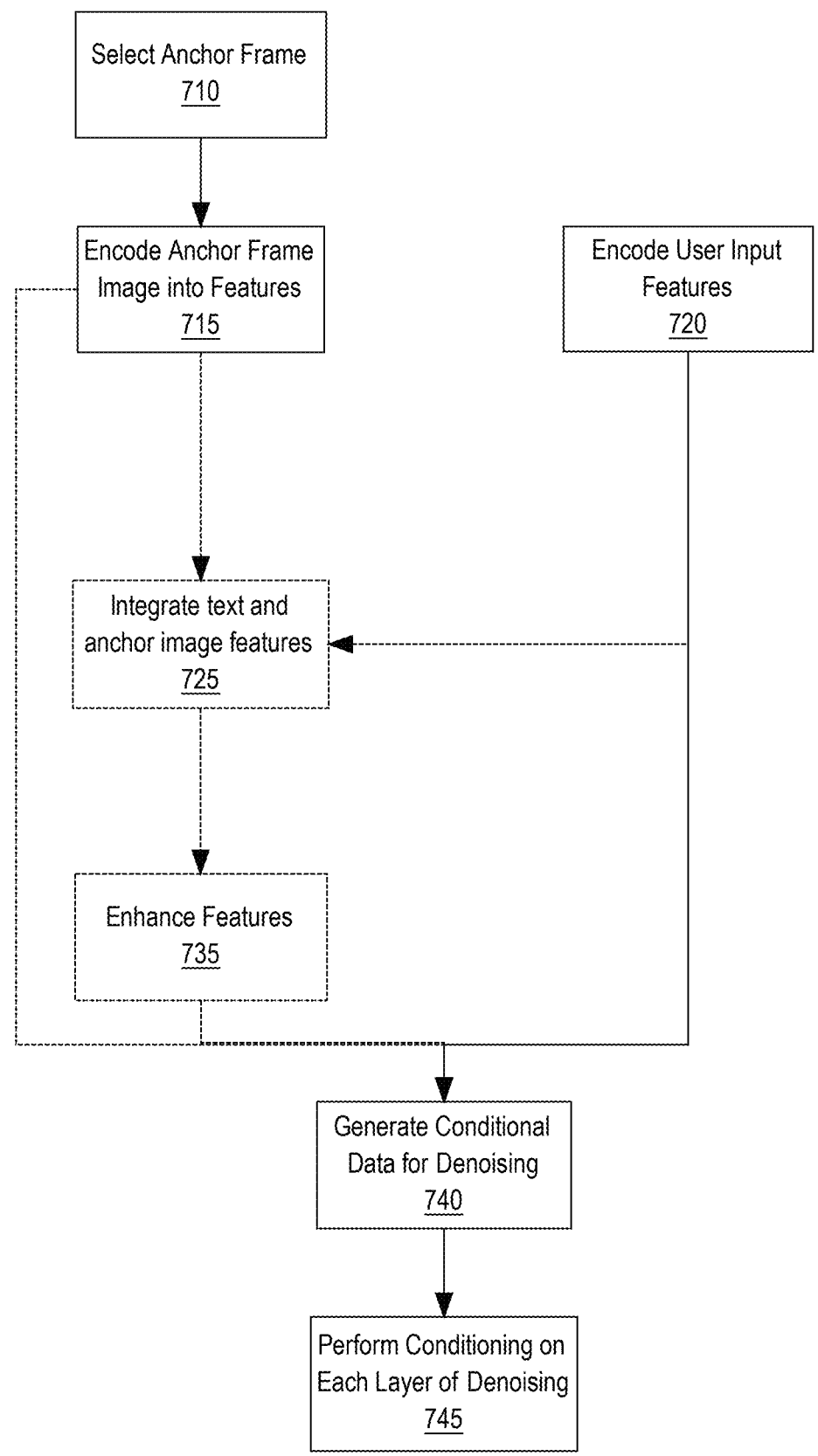
FIG. 7 is a block diagram depicting the process for conditioning an output sequence of frames with an anchor frame, in an implementation.
Figure 8:
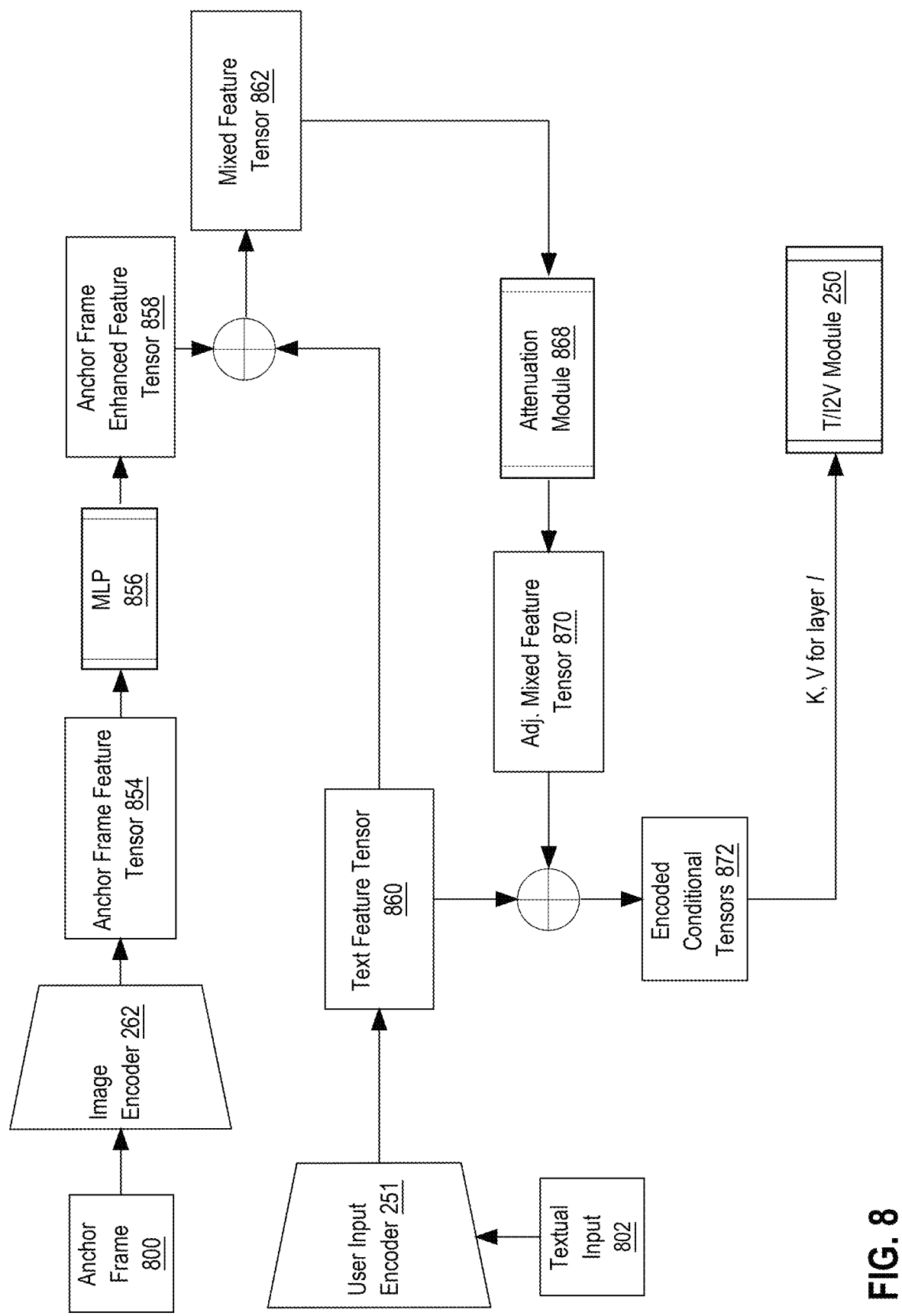
FIG. 8 is a block diagram that depicts the data flow for conditioning an output sequence of frames with an anchor frame, in an implementation.

FIG. 7 is a block diagram depicting the process for conditioning the output sequence of frames with an anchor frame, in an implementation. At step 710, the process selects an anchor frame. The anchor frame may be selected at random/arbitrarily from the initial frameset or any previously generated sequence frames. The anchor frame may also be selected using an algorithm or using user input having the same content as the user input request. However, the exact methodology used to select anchor frame(s) is not critical for the techniques described herein. FIG. 8 is a block diagram that depicts the data flow for conditioning an output sequence of frames with an anchor frame, in an implementation. For example, Anchor Frame 800 may be the first image/frame selected from the initially generated output sequence of frames.

Continuing with FIG. 7, at step 715, the process encodes the anchor frame into a tensor of image features that contains pixel-based embeddings of the image. The process provides Anchor Frame 800 to Image Encoder 262. In an implementation, Image Encoder 262 is the same type of encoder as User Input Encoder 251 for encoding Textual Input 802 into corresponding textual features/embeddings. For example, Image Encoder 262 and User Input Encoder 251 may be a Contrastive Language-Image Pretraining (CLIP) encoder. CLIP Image Encoder 262 uses a transformer encoder to determine image pixel relationships across different dimensions and uses the attention mechanism to generate image features. CLIP Image Encoder 262 may extract high-level semantic information from the anchor frame in the form of embeddings (numerical representations of image features).

Accordingly, Image Encoder 262 may generate Anchor Frame Feature Tensor 854 that captures Anchor Frame 800's features. In an implementation, to further enhance features of Anchor Frame 800, the process may provide the Anchor Frame Tensor 854 to Multi-Layer Perceptron (MLP) 856 of Feature Enhancement Module 266. MLP 856 processes and refines the encoded representations of Anchor Frame Feature Tensor 854 produced by Image Encoder 262. MLP 856 is trained to refine the features learned by Image Encoder 262, potentially making the features more discriminative. MLP 856 may also transform the dimensionality of Anchor Frame Tensor 854 to match with output Text Feature Tensor 860 containing the embeddings of Textual Input 802.

Continuing with FIG. 7, at step 720, the process provides the textual input of AUI2VS 200 to User Input Encoder 251, which encodes the textual input into text features or the image input into image features. As discussed above, User Input Encoder 251 may be of the same type as Image Encoder 262. For example, User Input Encoder 251 may be a CLIP encoder that transforms Textual Input 802 and generates Text Feature Tensor 860 containing textual embeddings of Textual Input 802.

Alternatively, user input may be in an image form rather than a textual form. Accordingly, the process at step 720 may encode the user input image into a tensor of image features/embeddings.

APM-Integrating Textual and Anchor Frame Features

In one implementation, AUI2VS 200 balances the effect of conditioning by the anchor frame with that of the user input. The balancing may be performed by a) mixing the features of the anchor frame with that of the user input and/or b) weight-based attenuating the conditioning effect of the anchor frame (integrated with user feature or by itself) on the denoising for each layer of Denoising Encoder 252 and Denoising Decoder 258 of T/I2V Module 250. In such an implementation, the weights for attenuation are trained during the training of APM 260.

At step 725, the process integrates the features of the anchor frame, Anchor Frame 800, with the feature embeddings of the user input request, such as Textual Input 802, in an implementation. In one implementation, the integration may be performed based on the concatenation of the tensors containing the respective features of the anchor frame and user input request. For example, Anchor Frame Enhanced Feature Tensor 858 may be concatenated with Text Feature Tensor 860 to yield Mixed Feature Tensor 862.

Additionally or alternatively, at step 735, the process enhances the integrated tensor of textual and anchor frame features. For example, Feature Enhancement Module 266 may include a convolution module. The convolution module may perform a convolution on the combined feature tensor along one or more dimensions to integrate, refine, or contextualize features of the integrated tensor of features.

At step 740, the process generates conditional data for the denoising encoder and decoder based on the user input features and the anchor frame features. For anchor frame features, the process may use a tensor of only anchor frame features or the mixed tensor of the anchor frame and user input request features such as Mixed Feature Tensor 862.

In an implementation, Mixed Feature Tensor 862 is attenuated by weights trained (and normalized) per layer by Attenuation Module 868 of FIG. 8. Attenuation Module 868 generates Adjusted Mixed Tensor 870, which then may be integrated with Text Feature Tensor 860 to generate Encoded Conditional Tensor 872.

The attenuation weight tensor may be different for each layer of Denoising Encoder 252 and Denoising Decoder 258. For each layer, the corresponding trained attenuation weight tensor is multiplied with Mixed Feature Tensor 862 to attenuate the effect of the anchor frame features on the generation of the next output sequence of frames as compared to the effect of the user input request features.

Accordingly, at step 740, after the attenuation, for layer(s) of Encoder 252 or Decoder 258, the attenuated mixed features of the anchor frame and textual input for that layer are additionally combined with the features of the textual input. Thereby, the process, at step 740, generates per layer anchor frame/text input feature conditional data for denoising. For example, Adjusted Mixed Feature Tensor 870, adjusted by Attenuation Module 868, is added to Text Feature Tensor 860 for each layer. The combination generates Encoded Conditional Tensors 872 for the denoising layers of Encoder 252 and/or Decoder 258.

APM-Conditioning Denoising/Generating New Frames

At step 745, the process performs conditioning using the generated conditional data that contains features from the anchor frame and user input request. The conditioning is performed as part of the denoising process performed by Encoder 252 and/or Decoder 258. For example, Encoded Conditional Tensors 872 provide the key (K) and value (V) data for APM Conditioning 264. Thus, when Encoder 252 and/or Decoder 258 perform conditioning in its layer(s), the process selects the conditional data (keys and values) from Encoded Conditional Tensors 872 corresponding to that layer. The process may use the input tensor to the layer as the conditioning data. Such conditioning data may have been previously conditioned on the past frames from CAM Conditioning 214.

Training APM

APM 260's components, such as APM Conditioning Module 264 and Feature Enhancement Module 266, may be trained separately or together. Other components, such as Image Encoder 262, may be pre-trained similar to Pre-Trained T/I2V Module 250 (trained separately and on a different training set than APM 260). Accordingly, APM 260's training may be performed with pre-trained Image Encoder 262 and Pre-Trained T/I2V Module 250.

Figure 9:
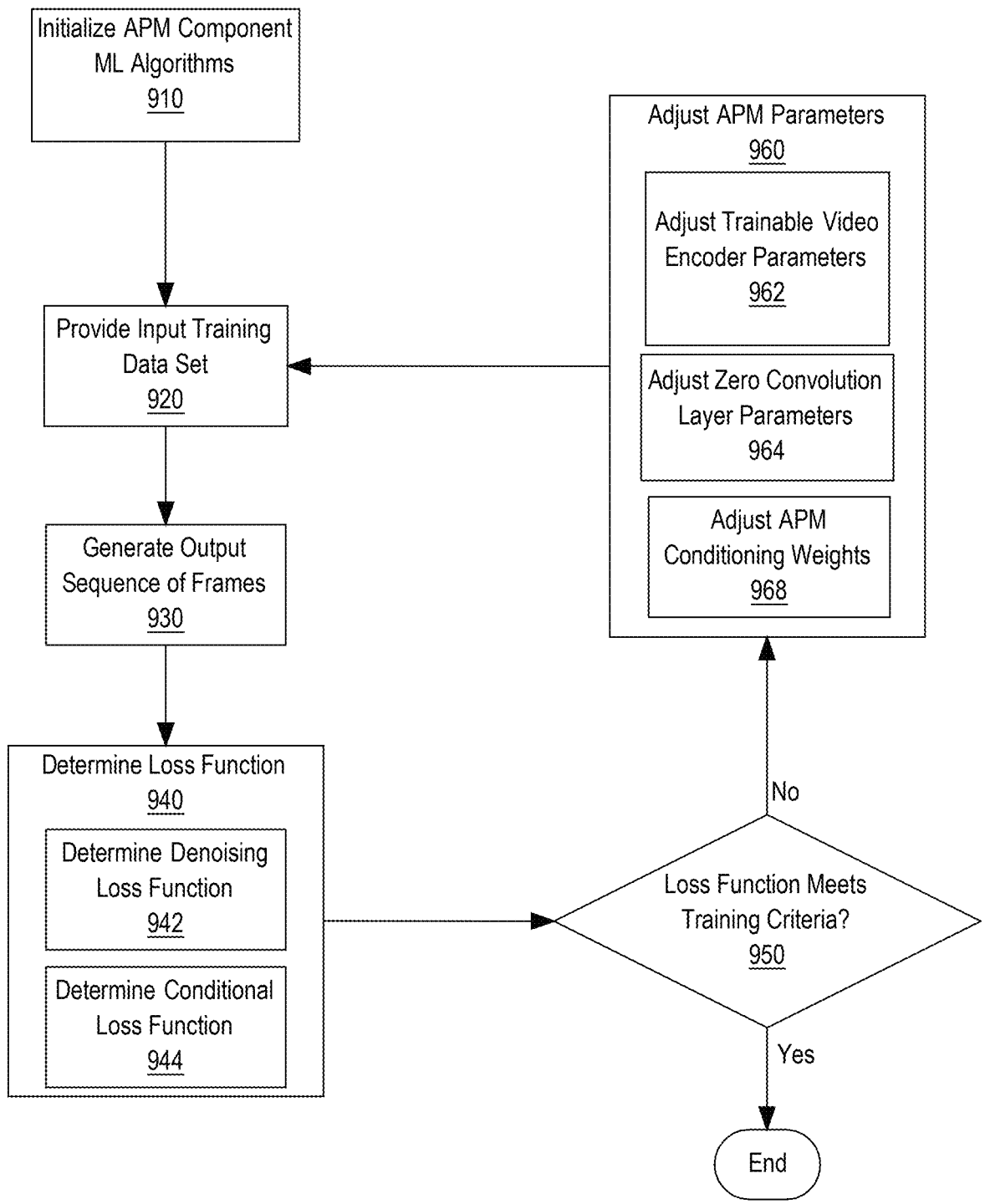
FIG. 9 is a block diagram depicting a process for training an Appearance Preservation Module (APM), in one or more implementations

FIG. 9 is a block diagram depicting a process for training APM 260, in one or more implementations. At step 910, the parameters of to be trained one or more machine learning algorithms of APM 260 are initialized. For example, Attenuation Module 868 of APM Conditioning Module 264 is initialized to have zero-valued weights. Thus, at the beginning of the training, the effect of the anchor frame on the conditioning of the AUI2VS 200 output sequence of frames is negated. In the next iterations of the training, the weight(s) may be changed to a non-zero value to gradually increase the effect to the point where it minimizes the loss function.

At step 920, the process provides a training data set to AUI2VS 200 for performing training. The training data set may include the actual noise added to the data during the noising of the frames (forward diffusion), the predicted noise data by T/I2V Module 250, the noisy video frame at each timestep, and (textual) input request for output.

At step 930, AUI2VS 200 generates the output sequence of frames for the provided input sequence of frames of the training data set. The output sequence of frames and other intermediate output data of various components of AUI2VS 200 are used to determine the loss function at step 940.

AUI2VS 200 determines the loss function using the training data set of the input sequence of frames and corresponding label data. In an implementation, the loss function may be a weighted average of multiple loss functions. One example of a loss function is the denoising loss function. At step 942, AUI2VS 200 may calculate the denoising loss function, which is based on the comparison of the noise level predicted by T/I2V Module 250 with the labeled noise level (the actual noise level) in the training data set of the input sequence of frames.

Another example of a loss function may be a conditioning loss. At step 944, the process may determine the conditioning loss function by comparing the features of the previous frame of the input sequence of frames with the features of the output sequence of frames.

At step 940, the training loss function may be determined by a weighted average of different loss functions, such as the denoising model loss function (calculated at step 942) and the conditioning loss function (calculated at step 944).

At step 950, the process determines whether the loss function meets the criteria for ending the training of APM 260. If, at step 950, the criteria for ending the training have not been met, then the process transitions to step 960.

At step 960, the process adjusts the trainable algorithms' parameters. At step 962, the process may adjust the parameters of MLP 856 or weights of the kernel of the one-dimensional convolution algorithm to generate more enhanced feature data of the anchor frame and/or the textual input. Additionally or alternatively, the process may adjust the parameters of Attenuation Module 868 to increase the effect of the anchor frame features on the conditioning of the output frame sequence at step 664. For example, if a particular weight of Attenuation Module 868 is eventually adjusted to 1, the corresponding feature (e.g., a value in Mixed Feature Tensor 862) is fully passed to be integrated with the textual input features to condition the output sequence of frames. Additionally or alternatively, at step 968, the process may adjust the weights of APM Conditioning 264 (attention algorithm). For example, the process may adjust the weights for K, and V for each layer of T/I2V Module 250 to appropriately condition the output frame sequence by the anchor and textual input conditional data, Encoded Conditional Tensors 872.

After a number of iterations, when at step 650, the criteria for training have been met, the training of machine learning algorithm(s) of APM 260 has successfully generated the machine learning models for APM Conditioning Module 264 and Feature Enhancement Module 266. APM 260 may be used according to the techniques discussed herein for the generation of the output sequence of frames.

Auto-Regressive Video Enhancement

To further improve the quality and resolution of AUI2VS 200 output sequence of frames, the process utilizes a high-resolution (1280×720) text-to-video model (e.g., Refiner Video-LDM) to autoregressively enhance 24-frame chunks of generated videos, in an implementation. Using a text-to-video model as a refiner/enhancer of 24-frame chunks is done by adding a substantial amount of noise to the input video-chunk and denoising with the text-to-video diffusion model.

In an implementation, the process executes a high-resolution text-to-video model with an input of a low-resolution video chunk (e.g., 24 frames). The process bilinearly upscales an output chunk of the output sequence of frames to the target high resolution. Then, the process encodes the frames using the image encoder E so that the process obtains a latent tensor x0. The process applies T'<T forward diffusion steps (noising steps) so that xT still contains signal information (mostly about the video structure) but with added noise. The process denoises the latent representation of the frames using the high-resolution video diffusion model.

To improve inconsistent transitions between the output chunks, the process uses shared noise between consecutive chunks and leverages the randomized blending approach discussed herein.

For example, given the low-resolution long video, the process splits the output sequence of frames into m chunks V1, . . . , Vm of F=24 frame-length such that each two consecutive chunks have an overlap of O=8 frames. For the backward diffusion at step t, starting from T', the process must sample noise to perform one denoising step. The process starts with the first chunk V1 and samples noise $\epsilon i \sim N(0, I)$ with $\epsilon i \in R F \times h \times w \times c$. For each subsequent chunk Vi, i>1, the process sample noise $\epsilon i \sim N(0, I)$ with $\epsilon i \in R(F-O) \times h \times w \times c$ and concatenate it along the frame dimension with the noise $\epsilon F-O:Fi-1$ that was sampled for the O overlapping frames of the previous chunk, i.e. $\epsilon i:=$concat $([\epsilon F-O:Fi-1, \epsilon i], dim=0)$, for all i=2, . . . , m, so that the process obtains shared noise for overlapping frames. The process performs one denoising step using $\epsilon i$ and obtains for chunk Vi the latent tensor xt−1(i).

To improve consistency significantly and to remove transition misalignment, in an implementation, the process uses the randomized blending technique discussed herein. Consider the latent tensors xF−O:Ft−1(i−1) and x1:Ot−1(i) of two consecutive chunks Vi−1, Vi at denoising step t−1. The latent tensor xt−1(i−1) of chunk Vi−1 possesses a smooth transition from its first frames to the overlapping frames, while the latent tensor xt−1(i) possesses a smooth transition from the overlapping frames to the subsequent frames. Thus, the process combines the two latent tensors via concatenation, by randomly sampling a frame index fthr from {0, . . . , O} then taking from xF−O:Ft−1(i−1) the latent tensor of the first fthr frames and from x1:Ot−1(i) the latent tensor of the frames starting from fthr+1. Then, the process updates the latent tensor of the entire long video xt−1 on the overlapping frames and performs the next denoising step. Accordingly, for a frame $f \in \{1, . . . , O\}$ of the overlap and diffusion/denoising step t, the latent tensor of chunk Vi−1 is used with probability 1−f/(O+1).

By using a probabilistic mixture of the latent tensors in an overlapping region, the process successfully diminishes inconsistencies between output chunks.

Further Details on Training Machine Learning Model

Machine learning techniques include applying a machine learning algorithm on a training data set, for which outcome(s) are known, with initialized parameters whose values are modified in each training iteration to more accurately yield the known outcome(s) (referred herein as "label(s)"). Based on such application(s), the techniques generate a machine-learning model with known parameters. Thus, a machine learning model includes a model data representation or model artifact. A model artifact comprises parameter values, which are applied by a machine learning algorithm to the input to generate a predicted output. Training a machine learning model entails determining the parameter values of the model artifact. The structure and organization of the parameter values depend on the machine learning algorithm.

Accordingly, the term "machine learning algorithm" (or simply "algorithm") refers herein to a process or set of rules to be followed in calculations in which a model artifact, comprising one or more parameters for the calculations, is unknown. The term "machine learning model" (or simply "model") refers herein to the process or set of rules to be followed in the calculations in which the model artifact, comprising one or more parameters, is known and has been derived based on the training of the respective machine learning algorithm using one or more training data sets. Once trained, the input is applied to the machine learning model to make a prediction, which may also be referred to herein as a predicted outcome or output.

In supervised training, training data is used by a supervised training algorithm to train a machine learning model. The training data includes input and "known" output, label. In an implementation, the supervised training algorithm is an iterative procedure. In each iteration, the machine learning algorithm applies the model artifact and the input to generate a predicted output. An error or variance between the predicted output and the known output is calculated using an objective function, loss function. In effect, the output of the loss function indicates the accuracy of the machine learning model based on the particular state of the model artifact in the iteration. By applying an optimization algorithm based on the loss function, the parameter values of the model artifact are adjusted. The iterations may be repeated until the desired accuracy is achieved or some other criteria are met.

In an implementation, to iteratively train an algorithm to generate a trained model, a training data set may be arranged such that each row of the data set is input to a machine learning algorithm and further stores the corresponding actual outcome, label value, for the row. For example, each row of the adult income data set represents a particular adult for whom the outcome is known, such as whether the adult has a gross income over $500,000. Each column of the adult training dataset contains numerical representations of a particular adult characteristic (e.g., whether an adult has a college degree or the age of an adult) based on which the algorithm, when trained, can accurately predict whether any adult (even one who has not been described by the training data set) has a gross income over $500,000.

The row values of a training data set may be provided as inputs to a machine learning algorithm and may be modified based on one or more parameters of the algorithm to yield a predicted outcome. The predicted outcome for a row is compared with the label value, and based on the difference, an error value is calculated. One or more error values for the batch of rows are used in a statistical aggregate function to calculate an error value for the batch. The "loss" term refers to an error value for a batch of rows.

At each training iteration, based on one or more predicted values, the corresponding loss values for the iteration are calculated. For the next training iteration, one or more parameters are modified to reduce the loss based on the current loss. Any number of iterations on a training data set may be performed to reduce the loss. The training iterations using a training data set may be stopped when the change in the losses between the iterations is within a threshold. In other words, the iterations are stopped when the loss for different iterations is substantially the same.

After the training iterations, the generated machine learning model includes the machine learning algorithm with the model artifact that yielded the smallest loss.

For example, the above-mentioned adult income data set may be iterated using the Support Vector Machines (SVM) algorithm to train an SVM-based model for the adult income data set. Each row of the adult data set is provided as an input to the SVM algorithm, and the result, the predicted outcome, of the SVM algorithm is compared to the actual outcome for the row to determine the loss. Based on the loss, the parameters of the SVM are modified. The next row is provided to the SVM algorithm with the modified parameters to yield the next row's predicted outcome. The process may be repeated until the difference in loss values of the previous iteration and the current iteration is below a pre-defined threshold or, in some implementations, until the difference between the smallest loss value achieved and the current iteration's loss is below a pre-defined threshold.

Once the machine learning model for the machine learning algorithm is determined, a new data set for which an outcome is unknown may be used as input to the model to calculate the predicted outcome(s) for the new data set.

In a software implementation, when a machine learning model is referred to as receiving an input, executing, and/or generating output or prediction, a computer system process executing a machine learning algorithm applies the model artifact against the input to generate predicted output. A computer system process executes a machine learning algorithm by executing software configured to cause the execution of the algorithm.

Further Details on Machine Learning Algorithms and Domains

A machine learning algorithm may be selected based on the domain of the problem and the intended type of outcome required by the problem. The non-limiting examples of algorithm outcome types may be discrete values for problems in the classification domain, continuous values for problems in the regression domain, or anomaly detection problems in the clustering domain.

However, even for a particular domain, there are many algorithms to choose from for selecting the most accurate algorithm to solve a given problem. As non-limiting examples, in a classification domain, Support Vector Machines (SVM), Random Forests (RF), Decision Trees (DT), Bayesian networks (BN), stochastic algorithms such as genetic algorithms (GA), or connectionist topologies such as artificial neural networks (ANN) may be used.

Implementations of machine learning may rely on matrices, symbolic models, and hierarchical and/or associative data structures. Parameterized (i.e., configurable) implementations of best-of-breed machine learning algorithms may be found in open-source libraries such as Google's TensorFlow for Python and C++ or Georgia Institute of Technology's MLPack for C++. Shogun is an open-source C++ ML library with adapters for several programming languages, including C#, Ruby, Lua, Java, MatLab, R, and Python.

Hyper-Parameters, Cross-Validation and Algorithm Selection

A type of machine algorithm may have unlimited variants based on one or more hyper-parameters. The term "hyper-parameter" refers to a parameter in a model artifact that is set before the training of the machine algorithm model and is not modified during the training of the model. In other words, a hyper-parameter is a constant value that affects (or controls) the generated trained model independent of the training data set. A machine learning model with a model artifact that has only hyper-parameter values set is referred to herein as a "variant of a machine learning algorithm" or simply "variant." Accordingly, different hyperparameter values for the same type of machine learning algorithm may yield significantly different loss values on the same training data set during the training of a model.

For example, the SVM machine learning algorithm includes two hyperparameters: "C" and "gamma." The "C" hyper-parameter may be set to any value from 10-3 to 105, while the "gamma" hyper-parameter may be set from 10-5 to 103. Accordingly, there are endless permutations of the "C" and "gamma" parameters that may yield different loss values for training the same adult income training data set.

Therefore, to select a type of algorithm or, moreover, to select the best-performing variant of an algorithm, various hyper-parameter selection techniques are used to generate distinct sets of hyper-parameter values. Non-limiting examples of hyper-parameter value selection techniques include a Bayesian optimization such as a Gaussian process for hyper-parameter value selection, a random search, a gradient-based search, a grid search, hand-tuning techniques, a tree-structured Parzen Estimators (TPE) based technique.

With distinct sets of hyper-parameters values selected based on one or more of these techniques, each machine learning algorithm variant is trained on a training data set. A test data set is used as an input to the trained model for calculating the predicted result values. The predicted result values are compared with the corresponding label values to determine the performance score. The performance score may be computed based on calculating the error rate of predicted results in relation to the corresponding labels. For example, in a categorical domain, if out of 10,000 inputs to the model, only 9,000 matched the labels for the inputs, then the performance score is computed to be 90%. In non-categorical domains, the performance score may be further based on a statistical aggregation of the difference between the label value and the predicted result value.

The term "trial" refers herein to the training of a machine learning algorithm using a distinct set of hyper-parameter values and testing the machine learning algorithm using at least one test data set. In an implementation, cross-validation techniques, such as k-fold cross-validation, are used to create many pairs of training and test datasets from an original training data set. Each pair of data sets together contains the original training data set, but the pairs partition the original data set in different ways between a training data set and a test data set. For each pair of data sets, the training data set is used to train a model based on the selected set of hyperparameters, and the corresponding test data set is used for calculating the predicted result values with the trained model. Based on inputting the test data set to the trained machine learning model, the performance score for the pair (or fold) is calculated. If there is more than one pair (i.e., fold), then the performance scores are statistically aggregated (e.g., average, mean, min, max) to yield a final performance score for the variant of the machine learning algorithm.

Each trial is computationally very expensive, as it includes multiple training iterations for a variant of the machine algorithm to generate the performance score for one distinct set of hyper-parameter values of the machine learning algorithm. Accordingly, reducing the number of trials can dramatically reduce the necessary computational resources (e.g., processor time and cycles) for tuning.

Furthermore, since the performance scores are generated to select the most accurate algorithm variant, the more precise the performing score itself is, the more precise the generated model's prediction relative accuracy is compared to other variants. Indeed, once the machine learning algorithm and its hyper-parameter value-based variant are selected, a machine model is trained by applying the algorithm variant to the full training data set using the techniques discussed above. This generated machine-learning model is expected to predict the outcome with more accuracy than the machine-learning models of any other variant of the algorithm.

The precision of the performance score itself depends on how much computational resources are spent on tuning hyper-parameters for an algorithm. Computational resources can be wasted on testing sets of hyper-parameter values that cannot yield the desired accuracy of the eventual model.

Similarly, less (or no) computational resources may be spent on tuning those hyper-parameters for a type of algorithm that is most likely to be less accurate than another type of algorithm. Accordingly, the number of trials may be reduced or eliminated for hyper-parameters of discounted algorithms, thus substantially increasing the performance of the computer system.

Software Overview

Figure 10:
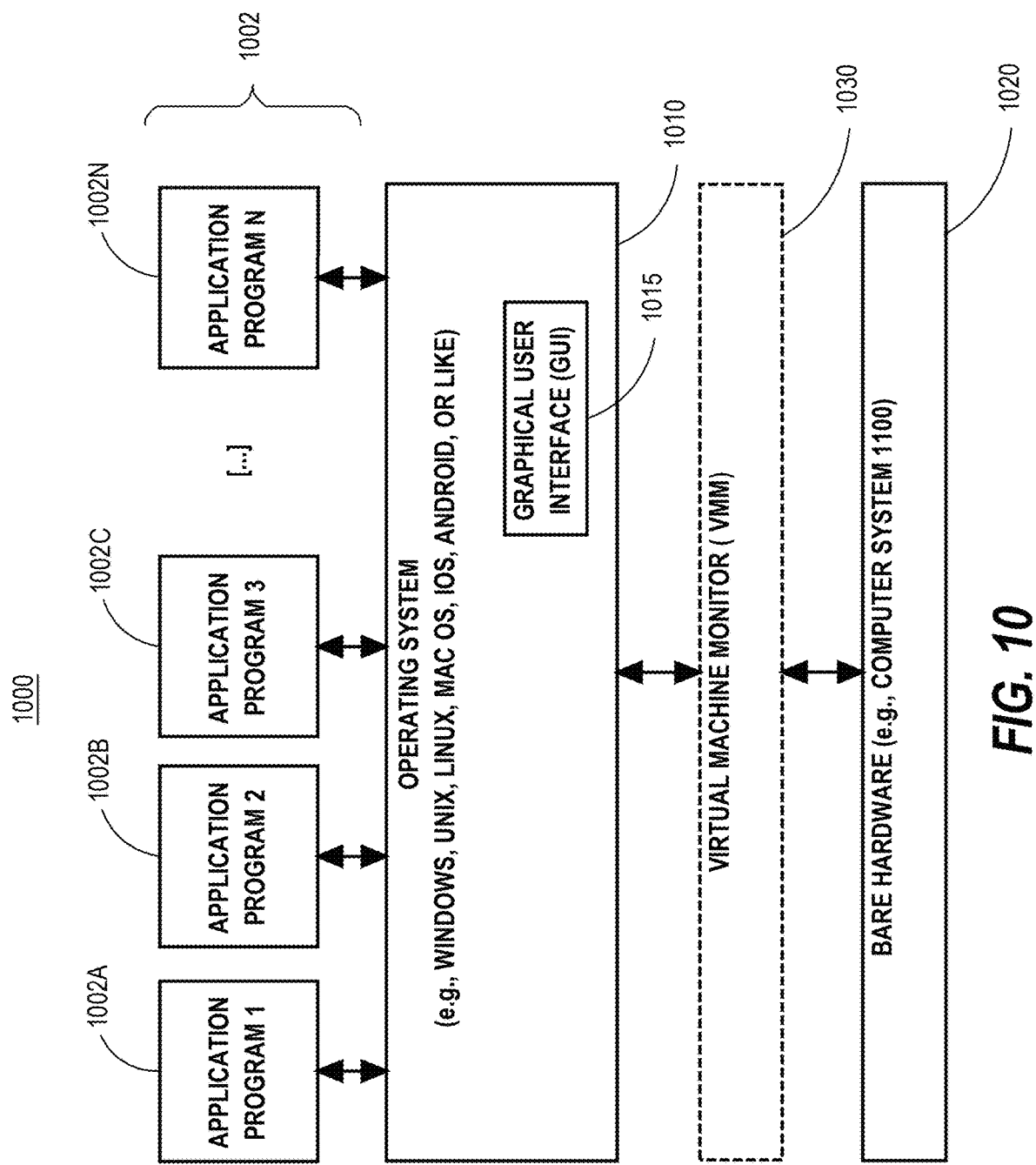
FIG. 10 is a block diagram of a basic software system, in one or more implementations.
Figure 11:
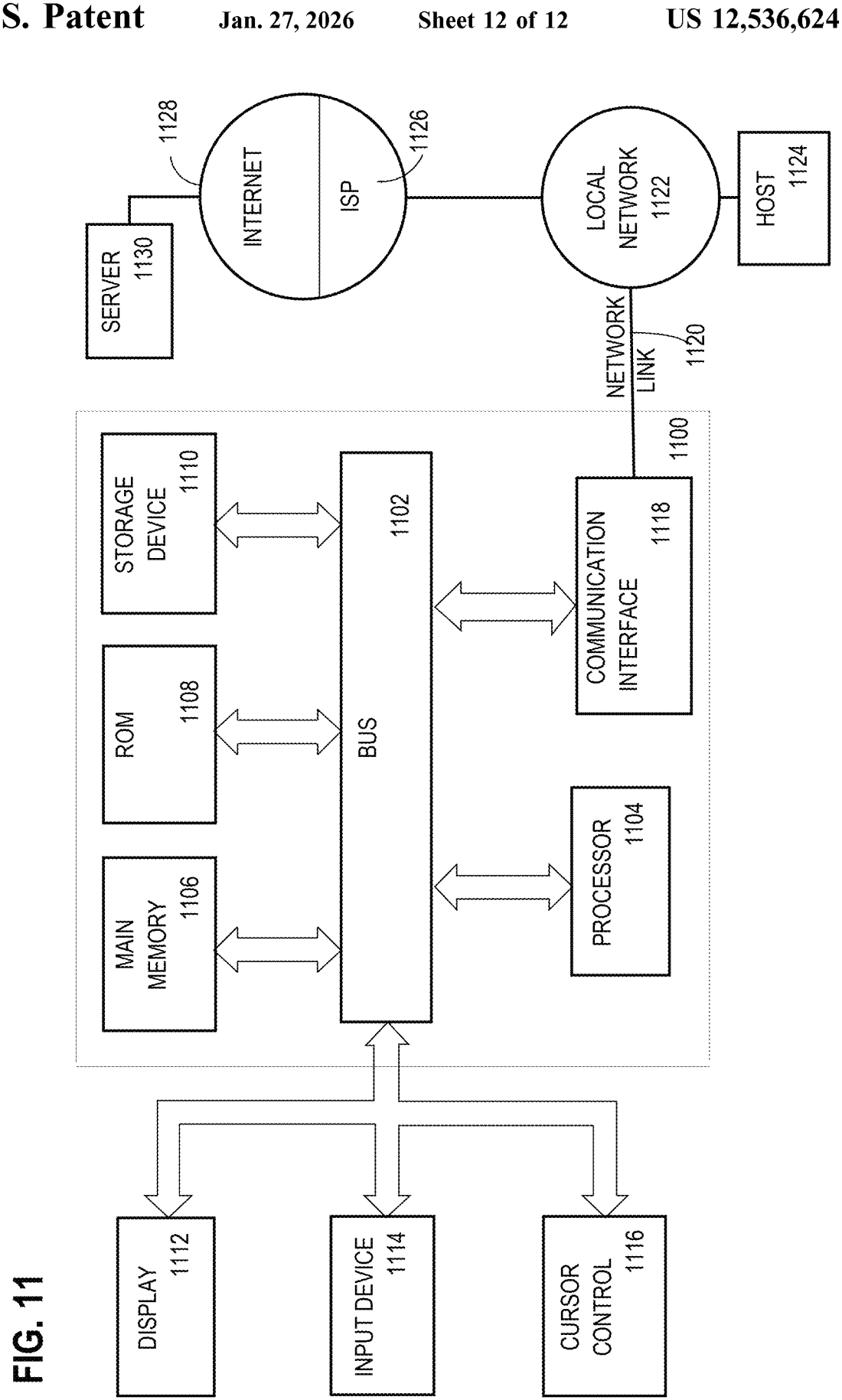
FIG. 11 is a block diagram that illustrates a computer system upon which an implementation of the invention may be implemented.

FIG. 10 is a block diagram of a basic software system 1000 that may be employed for controlling the operation of computing system 1100 of FIG. 11. Software system 1000 and its components, including their connections, relationships, and functions, are meant to be exemplary only, and not meant to limit implementations of the example implementation(s). Other software systems suitable for implementing the example implementation(s) may have different components, including components with different connections, relationships, and functions.

Software system 1000 is provided for directing the operation of computing system 1100. Software system 1000, which may be stored in system memory (RAM) 1106 and on fixed storage (e.g., hard disk or flash memory) 1110, includes a kernel or operating system (OS) 1010.

The OS 1010 manages low-level aspects of computer operation, including managing execution of processes, memory allocation, file input and output (I/O), and device I/O. One or more application programs represented as 1002A, 1002B, 1002C . . . 1002N, may be "loaded" (e.g., transferred from fixed storage 1110 into memory 1106) for execution by the system 1000. The applications or other software intended for use on computer system 1100 may also be stored as a set of downloadable computer-executable instructions, for example, for downloading and installation from an Internet location (e.g., a Web server, an app store, or another online service).

Software system 1000 includes a graphical user interface (GUI) 1015, for receiving user commands and data in a graphical (e.g., "point-and-click" or "touch gesture") fashion. These inputs, in turn, may be acted upon by the system 1000 in accordance with instructions from operating system 1010 and/or application(s) 1002. The GUI 1015 also serves to display the results of operation from the OS 1010 and application(s) 1002, whereupon the user may supply additional inputs or terminate the session (e.g., log off).

OS 1010 can execute directly on the bare hardware 1020 (e.g., processor(s) 1104) of computer system 1100. Alternatively, a hypervisor or virtual machine monitor (VMM) 1030 may be interposed between the bare hardware 1020 and the OS 1010. In this configuration, VMM 1030 acts as a software "cushion" or virtualization layer between the OS 1010 and the bare hardware 1020 of the computer system 1100.

VMM 1030 instantiates and runs one or more virtual machine instances ("guest machines"). Each guest machine comprises a "guest" operating system, such as OS 1010, and one or more applications, such as application(s) 1002, designed to execute on the guest operating system. The VMM 1030 presents the guest operating systems with a virtual operating platform and manages the execution of the guest operating systems.

In some instances, the VMM 1030 may allow a guest operating system to run as if it is running on the bare hardware 1020 of computer system 1100 directly. In these instances, the same version of the guest operating system configured to execute on the bare hardware 1020 directly may also execute on VMM 1030 without modification or reconfiguration. In other words, VMM 1030 may provide full hardware and CPU virtualization to a guest operating system in some instances.

In other instances, a guest operating system may be specially designed or configured to execute on VMM 1030 for efficiency. In these instances, the guest operating system is "aware" that it executes on a virtual machine monitor. In other words, VMM 1030 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system and may run under the control of other programs being executed on the computer system.

Multiple threads may run within a process. Each thread also comprises an allotment of hardware processing time but share access to the memory allotted to the process. The memory is used to store the content of processors between the allotments when the thread is not running. The term thread may also be used to refer to a computer system process in multiple threads that are not running.

Hardware Overview

According to one implementation, the techniques described herein are implemented by one or more special-purpose computing devices. The special-purpose computing devices may be hard-wired to perform the techniques, or may include digital electronic devices such as one or more application-specific integrated circuits (ASICs) or field-programmable gate arrays (FPGAs) that are persistently programmed to perform the techniques, or may include one or more general-purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 11 is a block diagram that illustrates a computer system 1100 upon which an implementation of the invention may be implemented. Computer system 1100 includes a bus 1102 or other communication mechanism for communicating information, and a hardware processor 1104 coupled with bus 1102 for processing information. Hardware processor 1104 may be, for example, a general-purpose microprocessor.

Computer system 1100 also includes a main memory 1106, such as a random access memory (RAM) or another dynamic storage device, coupled to bus 1102 for storing information and instructions to be executed by processor 1104. Main memory 1106 also may be used for storing temporary variables or other intermediate information during execution of instructions to be executed by processor 1104. Such instructions, when stored in non-transitory storage media accessible to processor 1104, render computer system 1100 into a special-purpose machine that is customized to perform the operations specified in the instructions.

Computer system 1100 further includes a read-only memory (ROM) 1108 or other static storage device coupled to bus 1102 for storing static information and instructions for processor 1104. A storage device 1110, such as a magnetic disk or optical disk, is provided and coupled to bus 1102 for storing information and instructions.

Computer system 1100 may be coupled via bus 1102 to a display 1112, such as a cathode ray tube (CRT), for displaying information to a computer user. An input device 1114, including alphanumeric and other keys, is coupled to bus 1102 for communicating information and command selections to processor 1104. Another type of user input device is cursor control 1116, such as a mouse, a trackball, or cursor direction keys for communicating direction information and command selections to processor 1104 and for controlling cursor movement on display 1112. This input device typically has two degrees of freedom in two axes, a first axis (e.g., x) and a second axis (e.g., y), that allows the device to specify positions in a plane.

Computer system 1100 may implement the techniques described herein using customized hard-wired logic, one or more ASICs or FPGAs, firmware and/or program logic which in combination with the computer system causes or programs computer system 1100 to be a special-purpose machine. According to one implementation, the techniques herein are performed by computer system 1100 in response to processor 1104 executing one or more sequences of one or more instructions contained in main memory 1106. Such instructions may be read into main memory 1106 from another storage medium, such as storage device 1110. Execution of the sequences of instructions contained in main memory 1106 causes processor 1104 to perform the process steps described herein. In alternative implementations, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 1110. Volatile media includes dynamic memory, such as main memory 1106. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire, and fiber optics, including the wires that comprise bus 1102. Transmission media can also take the form of acoustic or light waves, such as those generated during radio-wave and infra-red data communications.

Various forms of media may be involved in carrying one or more sequences of one or more instructions to processor 1104 for execution. For example, the instructions may initially be carried on a magnetic disk or solid-state drive of a remote computer. The remote computer can load the instructions into its dynamic memory and send the instructions over a telephone line using a modem. A modem local to computer system 1100 can receive the data on the telephone line and use an infra-red transmitter to convert the data to an infra-red signal. An infra-red detector can receive the data carried in the infra-red signal, and appropriate circuitry can place the data on bus 1102. Bus 1102 carries the data to main memory 1106, from which processor 1104 retrieves and executes the instructions. The instructions received by main memory 1106 may optionally be stored on storage device 1110 either before or after execution by processor 1104.

Computer system 1100 also includes a communication interface 1118 coupled to bus 1102. Communication interface 1118 provides a two-way data communication coupling to a network link 1120 that is connected to a local network 1122. For example, communication interface 1118 may be an integrated services digital network (ISDN) card, cable modem, satellite modem, or a modem to provide a data communication connection to a corresponding type of telephone line. As another example, communication interface 1118 may be a local area network (LAN) card to provide a data communication connection to a compatible LAN. Wireless links may also be implemented. In any such implementation, communication interface 1118 sends and receives electrical, electromagnetic, or optical signals that carry digital data streams representing various types of information.

Network link 1120 typically provides data communication through one or more networks to other data devices. For example, network link 1120 may provide a connection through local network 1122 to a host computer 1124 or to data equipment operated by an Internet Service Provider (ISP) 1126. ISP 1126, in turn, provides data communication services through the world wide packet data communication network now commonly referred to as the "Internet" 1128. Local network 1122 and Internet 1128 both use electrical, electromagnetic or optical signals that carry digital data streams. The signals through the various networks and the signals on network link 1120 and through communication interface 1118, which carry the digital data to and from computer system 1100, are example forms of transmission media.

Computer system 1100 can send messages and receive data, including program code, through the network(s), network link 1120 and communication interface 1118. In the Internet example, a server 1130 might transmit a requested code for an application program through Internet 1128, ISP 1126, local network 1122 and communication interface 1118.

The received code may be executed by processor 1104 as it is received, and/or stored in storage device 1110 or other non-volatile storage for later execution.

Computing Nodes and Clusters

A computing node is a combination of one or more hardware processors that each share access to a byte-addressable memory. Each hardware processor is electronically coupled to registers on the same chip of the hardware processor and is capable of executing an instruction that references a memory address in the addressable memory, and that causes the hardware processor to load data at that memory address into any of the registers. In addition, a hardware processor may have access to its separate exclusive memory that is not accessible to other processors. The one or more hardware processors may be running under the control of the same operating system A hardware processor may comprise multiple core processors on the same chip, each core processor ("core") being capable of separately executing a machine code instruction within the same clock cycles as another of the multiple cores. Each core processor may be electronically coupled to connect to a scratchpad memory that cannot be accessed by any other core processor of the multiple core processors.

A cluster comprises computing nodes that each communicate with each other via a network. Each node in a cluster may be coupled to a network card or a network-integrated circuit on the same board of the computing node. Network communication between any two nodes occurs via the network card or network integrated circuit on one of the nodes and a network card or network integrated circuit of another of the nodes. The network may be configured to support remote direct memory access.

In the foregoing specification, implementations of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:
   receiving a request to generate a sequence of video frames, the request comprising a user input data describing a particular content for the sequence of video frames;
   obtaining a particular anchor frame from a previous output sequence of frames that are generated in response to the request to generate the sequence of video frames and having the particular content;
   generating, by a denoising machine learning model, a next set of output video frames having the particular content, the generating of the next set of output video frames comprising:
      combining, by an appearance preservation module, anchor frame feature data of the particular anchor frame with text feature data of the user input data into mixed data of anchor frame and user input feature data, and based at least in part on the mixed data of anchor frame and user input feature data, generating corresponding mixed data of anchor frame and user input conditional data for a respective layer of the denoising machine learning model, and conditioning of layer output data of the respective layer by the corresponding mixed data of anchor frame and user input conditional data;

wherein conditioning of the layer output data of the respective layer by the corresponding mixed data of anchor frame and user input conditional data comprises:

determining a plurality of similarity scores between the mixed data of anchor frame and user input conditional data and layer input data of the respective layer of the denoising machine learning model, based at least in part on the plurality of similarity scores, modifying the mixed data of anchor frame and user input conditional data to modified conditional data, and based at least in part on the modified conditional data, generating, by the denoising machine learning model, the next set of output video frames.

2. The method of claim 1, wherein conditioning data for the conditioning of the layer output data is layer input data of the respective layer of the denoising machine learning model.

3. The method of claim 1, wherein combining, by the appearance preservation module, the anchor frame feature data of the particular anchor frame with the text feature data of the user input data into the mixed data of anchor frame and user input feature data comprises:

attenuating, using a corresponding trainable weight for each layer of a plurality of layers of the denoising machine learning model, the anchor frame feature data.

4. The method of claim 1, wherein combining, by the appearance preservation module, the anchor frame feature data of the particular anchor frame with the text feature data of the user input data into the mixed data of anchor frame and user input feature data comprises:

combining, by the appearance preservation module, the anchor frame feature data of the particular anchor frame with the text feature data of the user input data into an integrated anchor frame and user input feature data at least by performing a concatenation operation;

combining, by the appearance preservation module, the integrated anchor frame and user input feature data with the text feature data of the user input data into the mixed data of anchor frame and user input feature data at least by performing an addition operation.

5. The method of claim 1, further comprising:

generating the anchor frame feature data of the particular anchor frame at least by encoding the particular anchor frame by a pre-trained image encoder of a CLIP machine learning algorithm;

generating the text feature data of the user input data at least by encoding the user input data by a pre-trained text encoder of the CLIP machine learning algorithm.

6. The method of claim 1, wherein the previous output sequence of frames is an initial output sequence of frames first generated by the denoising machine learning model after receiving the user input data, and wherein the particular anchor frame is a first frame in the initial output sequence of frames.

7. A computer-implemented method comprising:

training one or more machine learning algorithms of an appearance preservation module with a denoising machine learning model comprising:

providing a training data set of training user input data, of training added noise data and of corresponding noisy video frame sequences to generate noiseless output video frame set, generating, by the denoising machine learning model, predicted noise data corresponding to the provided training data set, determining a loss function at least by comparing the predicted noise data with the training added noise data of the corresponding training noisy video frame sequences from the training data set, and adjusting one or more parameters of the one or more machine learning algorithms of the appearance preservation module based at least in part on the loss function;

receiving a request to generate a sequence of video frames, the request comprising a user input data describing a particular content for the sequence of video frames;

obtaining a particular anchor frame from a previous output sequence of frames that are generated in response to the request to generate the sequence of video frames and having the particular content;

generating, by the denoising machine learning model, a next set of output video frames having the particular content, the generating of the next set of output video frames comprising:

combining, by the appearance preservation module, anchor frame feature data of the particular anchor frame with text feature data of the user input data into mixed data of anchor frame and user input feature data, based at least in part on the mixed data of anchor frame and user input feature data, generating corresponding mixed data of anchor frame and user input conditional data for a respective layer of the denoising machine learning model, and conditioning of layer output data of the respective layer by the corresponding mixed data of anchor frame and user input conditional data.

8. The method of claim 7, wherein adjusting the one or more parameters of the one or more machine learning algorithms based at least in part on the loss function comprises:

before the training of the one or more machine learning algorithms, initializing to zero a corresponding trainable attention weight for each layer of a plurality of layers of the denoising machine learning model to exclude effect of the anchor frame feature data of the particular anchor frame on the generating of the noiseless output video frame set;

based at least in part on the loss function, adjusting the corresponding trainable attention weight for said each layer of the plurality of layers of the denoising machine learning model to affect the generating of the noiseless output video frame set.

9. The method of claim 7, wherein the denoising machine learning model, a text encoder for generating the text feature data of the user input data, and an image encoder for generating the anchor frame feature data of the particular anchor frame, are pre-trained, and the method further comprising training the one or more machine learning algorithms of the appearance preservation module without modifying trainable parameters of the denoising machine learning model, the text encoder, and the image encoder.

10. A system comprising one or more processors and one or more storage media storing one or more computer programs that include instructions, which, when executed by the one or more processors, cause:
  receiving a request to generate a sequence of video frames, the request comprising a user input data describing a particular content for the sequence of video frames;
  obtaining a particular anchor frame from a previous output sequence of frames that are generated in response to the request to generate the sequence of video frames and having the particular content;
  generating, by a denoising machine learning model, a next set of output video frames having the particular content, the generating of the next set of output video frames comprising:
    combining, by an appearance preservation module, anchor frame feature data of the particular anchor frame with text feature data of the user input data into mixed data of anchor frame and user input feature data, and
    based at least in part on the mixed data of anchor frame and user input feature data, generating corresponding mixed data of anchor frame and user input conditional data for a respective layer of the denoising machine learning model, and
    conditioning of layer output data of the corresponding layer by the respective mixed data of anchor frame and user input conditional data;
    wherein conditioning of the layer output data of the respective layer by the corresponding mixed data of anchor frame and user input conditional data comprises:
      determining a plurality of similarity scores between the mixed data of anchor frame and user input conditional data and layer input data of the respective layer of the denoising machine learning model,
      based at least in part on the plurality of similarity scores, modifying the mixed data of anchor frame and user input conditional data to modified conditional data, and
      based at least in part on the modified conditional data, generating, by the denoising machine learning model, the next set of output video frames.

11. The system of claim 10, wherein conditioning data for the conditioning of the layer output data is layer input data of the respective layer of the denoising machine learning model.

12. The system of claim 10, wherein the one or more programs include instructions, which, when executed by the one or more processors, further cause:
  attenuating, using a corresponding trainable weight for each layer of a plurality of layers of the denoising machine learning model, the anchor frame feature data.

13. The system of claim 10, wherein the one or more programs include instructions, which, when executed by the one or more processors, further cause:
  combining, by the appearance preservation module, the anchor frame feature data of the particular anchor frame with the text feature data of the user input data into an integrated anchor frame and user input feature data at least by performing a concatenation operation;
  combining, by the appearance preservation module, the integrated anchor frame and user input feature data with the text feature data of the user input data into the mixed data of anchor frame and user input feature data at least by performing an addition operation.

14. The system of claim 10, wherein the one or more programs include instructions, which, when executed by the one or more processors, further cause:
  generating the anchor frame feature data of the particular anchor frame at least by encoding the particular anchor frame by a pre-trained image encoder of a CLIP machine learning algorithm;
  generating the text feature data of the user input data at least by encoding the user input data by a pre-trained text encoder of the CLIP machine learning algorithm.

15. The system of claim 10, wherein the previous output sequence of frames is an initial output sequence of frames first generated by the denoising machine learning model after receiving the user input data, and wherein the particular anchor frame is a first frame in the initial output sequence of frames.

16. A system comprising one or more processors and one or more storage media storing one or more computer programs that include instructions, which, when executed by the one or more processors, cause:
  training one or more machine learning algorithms of an appearance preservation module with a denoising machine learning model comprising:
    providing a training data set of training user input data, of training added noise data and of corresponding training noisy video frame sequences to generate noiseless output video frame set,
    generating, by the denoising machine learning model, predicted noise data corresponding to the provided training data set,
    determining a loss function at least by comparing the predicted noise data with the training added noise data of the corresponding training noisy video frame sequences from the training data set, and
    adjusting one or more parameters of the one or more machine learning algorithms of the appearance preservation module based at least in part on the loss function;
  receiving a request to generate a sequence of video frames, the request comprising a user input data describing a particular content for the sequence of video frames;
  obtaining a particular anchor frame from a previous output sequence of frames that are generated in response to the request to generate the sequence of video frames and having the particular content;
  generating, by the denoising machine learning model, a next set of output video frames having the particular content, the generating of the next set of output video frames comprising:
    combining, by the appearance preservation module, anchor frame feature data of the particular anchor frame with text feature data of the user input data into mixed data of anchor frame and user input feature data,
    based at least in part on the mixed data of anchor frame and user input feature data, generating corresponding mixed data of anchor frame and user input conditional data for a respective layer of the denoising machine learning model, and
    conditioning of layer output data of the corresponding layer by the respective mixed data of anchor frame and user input conditional data.

17. The system of claim 16, wherein the one or more programs include instructions, which, when executed by the one or more processors, further cause:

before the training of the one or more machine learning algorithms, initializing to zero a corresponding trainable attention weight for each layer of a plurality of layers of the denoising machine learning model to exclude effect of the anchor frame feature data of the particular anchor frame on the generating of the noiseless output video frame set;

based at least in part on the loss function, adjusting the corresponding trainable attention weight for said each layer of the plurality of layers of the denoising machine learning model to affect the generating of the noiseless output video frame set.

18. The system of claim 16, wherein the denoising machine learning model, a text encoder for generating the text feature data of the user input data, and an image encoder for generating the anchor frame feature data of the particular anchor frame, are pre-trained, and wherein the one or more programs include instructions, which, when executed by the one or more processors, further cause training the one or more machine learning algorithms of the appearance preservation module without modifying trainable parameters of the denoising machine learning model, the text encoder, and the image encoder.

\* \* \* \* \*